United States Patent
Couch et al.

(10) Patent No.: US 9,189,960 B2
(45) Date of Patent: *Nov. 17, 2015

(54) COMPUTER-BASED TECHNOLOGY FOR AIDING THE REPAIR OF MOTOR VEHICLES

(75) Inventors: William Henry Couch, Nashville, TN (US); Julie Elizabeth Warpool, Nashville, TN (US); Mark Humble, Nashville, TX (US); Marc Haegelin, Nashville, TN (US); Stephen Krise, Nashville, TN (US); Michael Chastain, Nashville, TN (US); Ronald St. Denis, Nashville, TN (US); Terry Mitchell, Nashville, TN (US)

(73) Assignee: MANHEIM INVESTMENTS, INC., Las Vegas, NV (US)

( * ) Notice: Subject to any disclaimer, the term of this patent is extended or adjusted under 35 U.S.C. 154(b) by 840 days.

This patent is subject to a terminal disclaimer.

(21) Appl. No.: 13/460,292

(22) Filed: Apr. 30, 2012

(65) Prior Publication Data

US 2012/0297337 A1  Nov. 22, 2012

Related U.S. Application Data

(63) Continuation-in-part of application No. 11/421,320, filed on May 31, 2006, now Pat. No. 8,230,362.

(60) Provisional application No. 61/480,086, filed on Apr. 28, 2011.

(51) Int. Cl.
*G06F 3/048* (2013.01)
*G08G 1/16* (2006.01)
*G06Q 10/06* (2012.01)

(52) U.S. Cl.
CPC .......... *G08G 1/168* (2013.01); *G06Q 10/06313* (2013.01)

(58) Field of Classification Search
CPC ...................................................... B60R 19/34
USPC ............................................ 715/744, 746, 780
See application file for complete search history.

(56) References Cited

U.S. PATENT DOCUMENTS 4,507,872 A * 4/1985 Schermann ............ G01B 5/20
33/546
4,872,757 A * 10/1989 Cormack ............ G01N 21/909
348/131

(Continued)

FOREIGN PATENT DOCUMENTS

JP  2003-58653 A   2/2003
JP  2005-107722 A  4/2005

(Continued)

OTHER PUBLICATIONS

Official Action dated Mar. 27, 2015, issued in related Canadian Patent Application No. 2,652,972.

(Continued)

*Primary Examiner* — Daeho Song
(74) *Attorney, Agent, or Firm* — Nixon & Vanderhye P.C.

(57) ABSTRACT

A computer-assisted inspection system provides computer architectures and software controlled algorithms to automatically provide vehicle inspections and repair recommendations including estimated repair time and cost of depression type damage such as dents. Features provided by a handheld wireless touchscreen based inspection device include flat car part picking, auto grading including seller grading, and automatic calculation of body and bumper dent repair parameters and directions.

19 Claims, 31 Drawing Sheets

(56) References Cited

U.S. PATENT DOCUMENTS

| | | | |
|---|---|---|---|
| 4,899,292 A | 2/1990 | Montagna et al. | |
| 5,272,769 A | 12/1993 | Strnatka et al. | |
| 5,293,309 A * | 3/1994 | Sakai | G06Q 10/0875 705/29 |
| 5,317,503 A | 5/1994 | Inoue | |
| 5,377,098 A * | 12/1994 | Sakai | B60S 5/00 705/29 |
| 5,442,549 A | 8/1995 | Larson | |
| 5,758,300 A | 5/1998 | Abe | |
| 5,884,202 A | 3/1999 | Arjomand | |
| 6,052,631 A | 4/2000 | Busch et al. | |
| 6,094,609 A | 7/2000 | Arjomand | |
| 6,185,540 B1 | 2/2001 | Schreitmueller et al. | |
| 6,219,930 B1 * | 4/2001 | Reid | G01B 3/14 33/1 BB |
| 6,397,131 B1 | 5/2002 | Busch et al. | |
| 6,470,303 B2 | 10/2002 | Kidd et al. | |
| 6,529,808 B1 | 3/2003 | Diem | |
| 6,732,031 B1 | 5/2004 | Lightner et al. | |
| 6,775,602 B2 | 8/2004 | Gordon et al. | |
| 6,836,708 B2 | 12/2004 | Tripathi | |
| 6,885,981 B2 | 4/2005 | Bomar et al. | |
| 6,917,595 B2 | 7/2005 | Chang et al. | |
| 6,941,203 B2 | 9/2005 | Chen | |
| 6,965,324 B1 | 11/2005 | Suggs, Sr. | |
| 7,020,580 B2 | 3/2006 | Peters et al. | |
| 7,124,058 B2 | 10/2006 | Namaky et al. | |
| 7,197,444 B2 | 3/2007 | Bomar et al. | |
| 7,209,817 B2 | 4/2007 | Abdel-Malek et al. | |
| 7,228,298 B1 | 6/2007 | Raines | |
| 7,331,133 B2 * | 2/2008 | Bauernfeind | B62D 41/00 40/600 |
| 7,359,821 B1 | 4/2008 | Smith et al. | |
| 7,469,171 B2 | 12/2008 | Tefft et al. | |
| 7,693,896 B1 | 4/2010 | Raines | |
| 8,230,362 B2 * | 7/2012 | Couch | G01M 17/00 382/190 |
| 2002/0013685 A1 | 1/2002 | Kidd et al. | |
| 2002/0022897 A1 * | 2/2002 | Uegaki | B21D 1/06 700/90 |
| 2002/0058079 A1 * | 5/2002 | Uegaki | B21D 1/06 425/12 |
| 2002/0065687 A1 * | 5/2002 | Onoue | G06Q 40/08 705/4 |
| 2002/0069216 A1 * | 6/2002 | Bates | G06Q 30/06 715/234 |
| 2003/0130966 A1 | 7/2003 | Thompson et al. | |
| 2003/0154111 A1 * | 8/2003 | Dutra | G06Q 10/10 705/4 |
| 2003/0200151 A1 | 10/2003 | Ellenson et al. | |
| 2003/0204332 A1 * | 10/2003 | Beney | G07C 3/00 702/34 |
| 2004/0015278 A1 | 1/2004 | Gordon et al. | |
| 2004/0073434 A1 | 4/2004 | Volquardsen et al. | |
| 2004/0093100 A1 * | 5/2004 | Gleis | G05B 19/41875 700/95 |
| 2004/0111301 A1 | 6/2004 | Wahlbin et al. | |
| 2004/0117081 A1 | 6/2004 | Mori | |
| 2004/0117131 A1 | 6/2004 | Peters et al. | |
| 2004/0227523 A1 | 11/2004 | Namaky | |
| 2004/0243423 A1 | 12/2004 | Rix et al. | |
| 2005/0043868 A1 | 2/2005 | Mitcham | |
| 2005/0060179 A1 | 3/2005 | Tinberg et al. | |
| 2005/0108112 A1 | 5/2005 | Ellenson et al. | |
| 2005/0182537 A1 | 8/2005 | Tefft et al. | |
| 2005/0267707 A1 | 12/2005 | Mian et al. | |
| 2005/0283285 A1 | 12/2005 | Ying | |
| 2006/0031041 A1 | 2/2006 | Afshar et al. | |
| 2006/0061464 A1 | 3/2006 | Okada et al. | |
| 2006/0064393 A1 | 3/2006 | Orr | |
| 2006/0074790 A1 | 4/2006 | Anspach | |
| 2006/0114531 A1 | 6/2006 | Webb et al. | |
| 2006/0132291 A1 | 6/2006 | Dourney et al. | |
| 2006/0182055 A1 | 8/2006 | Coffee et al. | |
| 2006/0255968 A1 | 11/2006 | Woo et al. | |
| 2007/0052973 A1 * | 3/2007 | Yamaguchi | G01M 17/007 356/600 |
| 2007/0055420 A1 | 3/2007 | Krzystofczyk et al. | |
| 2007/0067075 A1 | 3/2007 | McMillan et al. | |
| 2007/0146728 A1 * | 6/2007 | Pristner | B60S 5/00 356/612 |
| 2007/0156311 A1 | 7/2007 | Elcock et al. | |
| 2007/0250232 A1 | 10/2007 | Dourney et al. | |
| 2008/0082221 A1 | 4/2008 | Nagy | |
| 2008/0154671 A1 | 6/2008 | Delk | |
| 2008/0267487 A1 * | 10/2008 | Siri | G06Q 10/087 382/141 |
| 2008/0281658 A1 | 11/2008 | Siessman | |

FOREIGN PATENT DOCUMENTS

| | | |
|---|---|---|
| JP | 2005-321971 A | 11/2005 |
| JP | 2006-91951 A | 4/2006 |

OTHER PUBLICATIONS

Official Action dated Jan. 31, 2013, issued in related Canadian Patent Application No. 2,652,972.

Official Action dated Oct. 25, 2013, issued in related Canadian Patent Application No. 2,652,972.

Official Action dated Aug. 14, 2014, issued in related Canadian Patent Application No. 2,652,972.

Buildfolio Real Estate/Construction Mobile Inspection Station, "The Buildfolio Solution," website information http://web.archive.org (Jan. 16, 2004).

FedBizOpps, Section: Special Notice, Notice of GSA's intent to enter into a sole source licensing agreement with Auto Auction Services Corp. (Aug. 16, 2007).

NYVIP Vehicle Inspection System Operators Manual; Yoyodyne, Inc; http://www.nyvip.us/pdf/NY-VIP_Operators_Manual_2_2_Final06.pdf (Nov. 19, 2004).

On-Board Diagnostics II (OBDII) and Light-Duty Vehicle Emission Related Inspection and Maintenance (I/M) Programs; D. Cope Enterprises; http://www.ccme.ca/assets/pdf/jia_trnsprt_obd_e.pdf (Apr. 2002).

Pen Computer Solutions, Inc. Mobile Data Collection, PDS Software Programming and Development, Palm and Pocket PC Custom Software Programming and Development Services, Windows Mobile and Handheld/Smartpone Developers and Programmers, Sample Customized Palm OS Application for Vehicle Inspection, Pen Computer Solutions, Inc., Las Vegas, NV, 6 pages (2005).

Polk & Associates LLC, "Pre-purchase Inspections," website information, 3 pages (2003).

SubPrime Auto Finance News, "AutoIMS Introduces Latest Version of Condition Report Writing Tool," Atlanta, GA (Jun. 7, 2007).

Vehicle Remarketing Magazine, "AutoIMS Leverages Collective Intelligence in Latest Version of Condition Report Writing Tool," Atlanta, GA (Apr. 25, 2007).

Ashley, Charles, "Insurers Ought to be in Still Pictures," Best's Review/Life-Health Insurance, vol. 95, Issue 6, 2 pages (Oct. 1994).

Beltran, John L., "Auto Appraisals, Shifting into High Gear," Best's Review, pp. 49-52 (1992).

Dickson, Paul et al., "Mosaic Generation for Under Vehicle Inspection," Proceedings of the Sixth IEEEE Workshop on Applications of Compute Vision (WACV '02), pp. 251-256 (2002).

Gramopadhye, A. et al., "The Use of Advance Technology for Visual inspection Training," Applied Ergonomics, vol. 29, No. 5, pp. 361-375 (Oct. 1998).

Greene, Richard, "Appraisal Product Piloted, Ready for Nationwide Rollout," Auto Remarketing Newsmagazine, Auto Remarketing. com, 3 pages (Apr. 28, 2006).

May, Andrew et al., "Opportunities and Challenges for Location Aware Computing in the Construction Industry," Mobile HCI '05 pp. 255-258 (Sep. 2002).

Smailagic, Asim et al., "User-Centered Interdisciplinary Design of Wearable Computers," Mobile Computing and Communications Review, vol. 3, No. 3, pp. 43-52 (Jul. 1999).

(56) References Cited

OTHER PUBLICATIONS

Tolinski, Michael, "Hands-Off inspection," Manufacturing Engineering, pp. 117-130 (2005).
Vora, Jeenal et al., "Using Virtual Reality Technology for Aircraft Visual Inspection Training: Presence and Comparison Studies," Applied Ergonomics, vol. 33, pp. 559-570 (2002).
Mitchell Repair Mate, screen shots (undated).
Vale Guidelines, Sheet Metal Repairs, 1 page (undated).
Vale Training Solutions, Inc., http://www.valetrainingsolutions.com/AboutUs.aspx (undated).
Burroughs, John, "How to Fix Those Dents in Your Car," Popular Science, pp. 138-141 (Mar. 1967).
Duffy, James E. et al., Auto Body Repair Technology, 4th Edition, Thomson Delmar Learning, Chapter 10 "Estimating Repair Costs" and Chapter 11 "Working Sheet Metal," pp. 262-287 and 307 (2004).
Fried, Jason, "Henrik Fisker: A Three-Part Interview with a Master Car Designer" (Apr. 19, 2007).
Gardner, Andrew, "Henrik Fisker on Aston Martin, Ford, and General Automotive Design: Part 1" (Jan. 15, 2005).
Halberstam, David, "An American Romance," Popular Mechanics, pp. 49, 50, 52, 54, 56 (May 1989).
Meredith, Mike, Paintless Dent Repair, "Skilled Technicians Remove Dents without Repainting," MSN Autos (2012).
International Search Report and Written Opinion, International Application No. PCT/US07/12834, Jul. 3, 2008.

\* cited by examiner

Vehicle Condition Report
Inspection Date: 2/14/2003
Control Number: 200302100001

VEHICLE INFORMATION

| | | | |
|---|---|---|---|
| VIN: | SALPV1111XA111111 | Year: | 1999 |
| Make: | Range Rover | Model: | 4.6hse 4x4 |
| Exterior Color: | Silver | | |
| Paint Type: | | | |
| Interior Color/Type: | Black, Leather | | |
| Engine Cylinders: | 8 | Engine Type: | Gas |
| Body: | 4 Door SUV | Engine Liter: | 4.6 |
| Radio: | Compact Disc Player | Premium Radio: | |
| Wheel Type: | Aluminum | | |
| Transmission: | Automatic with Overdrive | | |
| Odometer Type: | ODTPC 6 - Digital | Mileage: | 56117 |

INSPECTION INFORMATION

Inspector: barmour
Inspector Type: ASSIGNMENT
Tag Number: none          Tag State: CA

CONVENIENCE AND EQUIPMENT OPTIONS

| | | | | |
|---|---|---|---|---|
| Power Antenna | ✓ Power Trunk Lift Gate | ✓ Power Door Locks | ✓ Power Windows | ✓ Power Mirrors |
| Power Passenger Seat | ✓ Power Seat | | | |
| ✓ AC | Bed Liner | ✓ Cruise Control | Fog Lamps | Heated Mirror |
| Radar Detector | ✓ Security System | Special Wheel Covers | Telescopic Steering Wheel | Trip Computer |
| Wheel Locks | After Market Rim | Bug Deflector | Drivers Air Bag | ✓ Four Wheel Drive |
| ✓ Heated Seats | ✓ Rear Defogger | ✓ Tilt Steering Wheel | ✓ Trip Counter | Special Wheels |
| Air Scoop | Camper Shell | Dual AC | Gold Package | Video Player |
| ✓ Keyless Entry | ✓ Rear Wiper | Skid Plate | Spoiler | ✓ Tinted Windows |
| Two Wheel Drive | Auto Level Suspension | Cell Phone | ✓ Dual Air Bag | Grille Guard |
| Light Bar | Roll Bar | Sliding Rear Glass | Step Bumper | Traction Control |
| VCR | Auxiliary Fuel Tank | Chrome Bed Rails | Fifth Wheel | Ground Effects |
| ✓ Luggage Rack | Running Boards | Special Paint & Trim | Sunroof Wind Deflector | ✓ Trailering Package |

EXTERIOR/INTERIOR DAMAGE LIST

| System/Component | Damage Type | Severity | Location |
|---|---|---|---|
| ABS Light: | Illuminated | Check and Advise | Interior |

FIG. 1C-1

| | | | | |
|---|---|---|---|---|
| Coolant: | Low Level | Check and Advise | Exterior | |
| Glove Box Door: | Mis-aligned | Other Severity | Interior | |
| Front Bumper Cover: | Scuffed | Colorsand | Front | |
| Mirror Outside Right: | Scratched | 2" to 3" | Front-right | |

TIRES

| | Section Width | Aspect Ratio | Type | Rim Diameter | Tread Depth | Manufacturer |
|---|---|---|---|---|---|---|
| *Example:* | 225 | 50 | R | 16 | 8/32 | *Goodyear* |
| Left Front: | 225 | 70 | R | 16 | 5/32 | Cooper |
| Right Front: | 225 | 70 | R | 16 | 5/32 | Cooper |
| Left Rear: | 225 | 70 | R | 16 | 5/32 | Cooper |
| Right Rear: | 225 | 70 | R | 16 | 5/32 | Cooper |
| Spare: | 255 | 65 | R | 16 | 7/32 | OTHER |

COMMENTS low coolant loose wire in main loom glove box loose abs light on drive belt cracked hoses appear to be original tire size not manuf specs Although a professional inspection performed by a trained, certified vehicle inspector can be of significant value, an inspection is not a guarantee that the vehicle is free from defects or that the inspector has identified all existing flaws. A vehicle inspection is not a safety or title inspection, a warranty, or an insurance policy. Our inspection services are provided "as is", and "with all flaws". We disclaim all warranties, express and implied, regarding our inspection services, including our inspection reports, disclaim all liability for indirect, consequential, incidental, special, and punitive damages, and limit our liability to the amount paid in connection with this inspection.

INSPECTION REPORT LINK

To display a link to your Inspection Report within your web listing, do the following:

1) Click the "Select all in Textbox" button.

( Select All in Textbox )

```
<!--Link provided courtesy of Inspection Solution
(http://www.inspectionsolution.com)-->
http://www.inspectionsolution.com/ConditionReport/displayCR.asp?
ctrl=200302100001&crUrldisplayCR.asp
```

2) Click the right mouse button on the highlighted text and select Copy.
3) Open your web listing in a new browser window.
4) Find the area in which you want to paste the link.
5) Click Edit, Paste

PICTURES

FIG. 1C-2

*Tablet Computer*

```
<map name="4DSN_EXT">
<area shape="poly" coords="90,21,105,21,122,26,117,95,62,95,58,26,76,21" href="Hood|005000" title=""/>
<area shape="poly" coords="58,26,46,27,38,30,34,43,41,47,47,53,49,62,49,76,46,84,40,91,34,95,30,95,30,98,62,95" href="Left_Front_Fender|011000" title=""/>
<area shape="poly" coords="141,29,122,26,117,95,150,98,150,95,145,95,140,92,133,84,130,74,130,62,132,55,135,50,140,46,145,43" href="Right_Front_Fender|031000" title=""/>
<area shape="poly" coords="146,50,140,54,136,61,135,64,135,76,138,82,144,88,147,89,154,89,157,87,162,81,164,74,164,65,162,58,159,54,153,50" href="Right_Front_Wheel|032000" title=""/>
<area shape="poly" coords="39,55,41,55,39,55,34,50,26,50,21,53,17,59,15,64,15,76,19,83,25,89,33,89,37,87,41,83,44,75,44,62" href="Left_Front_Wheel|012000" title=""/>
<area shape="poly" coords="150,98,118,95,117,97,117,157,150,157" href="Right_Front_Door|033000" title=""/>
<area shape="poly" coords="62,95,30,98,29,99,29,157,62,157" href="Left_Front_Door|013000" title=""/>
<area shape="poly" coords="62,157,29,157,29,204,37,204,44,209,50,219,51,220,62,223" href="Left_Rear_Door|016000" title=""/>
<area shape="poly" coords="150,157,117,157,117,223,121,223,130,219,134,211,137,208,143,204,150,204" href="Right_Rear_Door|036000" title=""/>
<area shape="poly" coords="103,119,117,95,62,95,77,119" href="Windshield|001000" title=""/>
<area shape="poly" coords="62,95,76,118,76,157,62,157" href="Left_Front_Glass|014001" title=""/>
<area shape="poly" coords="117,157,103,157,103,119,117,95" href="Right_Front_Glass|034001" title=""/>
<area shape="poly" coords="103,119,103,207,76,207,76,119" href="Roof|006000" title=""/>
<area shape="poly" coords="117,157,103,157,103,207,117,223" href="Right_Rear_Glass|037001" title=""/>
<area shape="poly" coords="76,157,62,157,62,223,76,207" href="Left_Rear_Glass|017001" title=""/>
<area shape="poly" coords="103,207,117,223,63,223,76,207" href="Rear_Glass|023000" title=""/>
<area shape="poly" coords="117,223,117,292,104,294,73,294,62,292,62,223" href="Trunk_Lid|022000" title=""/>
<area shape="poly" coords="62,223,50,220,51,225,51,237,48,246,43,252,37,256,35,257,30,257,30,282,62,292" href="Left_Rear_Qtr_Panel|018000" title=""/>
<area shape="poly" coords="117,253,117,292,149,282,149,257,142,257,137,253,132,247,128,237,128,224,130,219,121,223,117,223" href="Right_Rear_Qtr_Panel|038000" title=""/>
<area shape="poly" coords="152,211,144,211,138,216,134,224,134,237,138,245,145,250,153,250,159,245,163,236,163,223,159,216" href="Right_Rear_Wheel|039000" title=""/>
<area shape="poly" coords="34,211,27,211,20,216,16,225,16,237,20,244,27,250,35,250,40,246,45,238,45,224,41,216" href="Left_Rear_Wheel|019000" title=""/>
<area shape="poly" coords="89,294,107,294,121,292,122,299,134,296,137,290,137,287,148,283,142,295,136,300,108,308,70,308,43,300,37,295,30,282,42,286,44,295,56,299,59,291,73,294" href="Rear_Bumper|024000" title=""/>
<area shape="poly" coords="59,291,42,286,44,295,56,299" href="Left_Rear_Lights|021105" title=""/>
<area shape="poly" coords="137,286,137,290,134,296,123,299,121,291" href="Right_Rear_Lights|021101" title=""/>
<area shape="poly" coords="85,316,79,321,75,329,75,343,80,351,85,355,93,355,100,350,104,342,104,329,101,322,94,316" href="Spare_Tire|026000" title=""/>
```

FIG.3C

| Client | Part | Damage | Severity | Action | Chargeability |
|---|---|---|---|---|---|
| Chrysler | Windshield | Broken | Replacement Req. | Replace | Chargeable |
| Chrysler | Windshield | Bulls-eye | >1" | Replace | Chargeable |
| Chrysler | Windshield | Bulls-eye | <1" | Repair | Non-Chargeable |
| Chrysler | Windshield | Chipped | >1" | Replace | Chargeable |
| Chrysler | Windshield | Chipped | <1" | Repair | Non-Chargeable |
| Chrysler | Hood | Scratch | Buffable | Buff | Non-Chargeable |
| Chrysler | Hood | Scratch | <1" | Touch-Up | Non-Chargeable |
| Chrysler | Hood | Scratch | 1" – 1.99" | Touch-Up | Chargeable |
| Chrysler | Hood | Scratch | >2" | Repaint | Chargeable |
| Chrysler | Hood | Dent | <1" | PDR* | Non-Chargeable |
| Chrysler | Hood | Dent | 1" – 5.99" | Repair | Chargeable |
| Chrysler | Hood | Dent | >6" | Replace | Chargeable |

*Paintless Dent Repair

Manheim Inspections
CONSISTENCY. ACCURACY. DELIVERED.

532

The Damages are listed in Top Down Order by Weight based on what moves the Grade the most (Bang for the Buck) New Grade If Approved Column is what the Grade will move to if you Approve the Damage for Repair.

Current Grade                    3.6 - Average
Approval Grade                   4.2 - Clean "Total Money Approved"           $528.00

[Back To Look Up Page]

Current Damages

| Approve | Item | Damage | Severity | Action | New Grade If Approved | Repair Cost | Click On Image |
|---|---|---|---|---|---|---|---|
| ☑ | L Qtr Panel | Dent/Paint Dmg | 5" to 6" | Repair | Approved | $256.00 | [x] Damage Image |
| ☑ | Front Bumper | Dent/Paint Dmg | 4" to 5" | Repair | Approved | $272.00 | [x] Damage Image |
| ☐ | Rear | Dent/Paint Dmg | 4" to 5" | Repair | 4.5 - Clean | $260.00 | [x] Damage Image |

Bumper Estimator Flow Chart

COMPUTER-BASED TECHNOLOGY FOR AIDING THE REPAIR OF MOTOR VEHICLES

CROSS-REFERENCES TO RELATED APPLICATIONS

This application claims the benefit of priority from provisional application No. 61/480,086 filed Apr. 28, 2011, incorporated herein by reference, and is a continuation-in-part of commonly-assigned U.S. patent application Ser. No. 11/421,320 filed May 31, 2006, also incorporated herein by reference.

STATEMENT REGARDING FEDERALLY SPONSORED RESEARCH OR DEVELOPMENT

None.

FIELD

The technology herein relates to repairing damaged mechanical objects such as motor vehicles, and more particularly to automated computer systems and methods for assessing, estimating authoring repair of, and repairing damage to motor vehicles and other items. More specifically, the technology herein relates to portable and other computer device user interfaces and analysis systems and methods providing automatic vehicle inspection and damage assessment services, methods and apparatus for directing repair of motor vehicles. In more detail, the technology herein relates to automatic computer methods, systems and structures providing accurate objective determinations and/or calculations of time and/or cost to repair depression damage such as dents to goods including but not limited to motor vehicles.

BACKGROUND AND SUMMARY

In America, cars are not merely transportation; they are also aesthetic works of art and symbols of freedom, adventure and individuality. As a nation with many more cars than licensed drivers, we Americans love our cars. America's love affair with cars may be based on the size of our country, the independence of our people, our desire for mobility, or perhaps on our love of freedom. These characteristics, which set our country apart from others, have long made the motor vehicle and the open road central fixtures in our lives and our imaginations.

Many Americans make a statement with the car they choose to drive. Many of us are passionate about our cars. Texans love their pickup trucks and SUVs, and Vermonters love their Subarus. When certain cars drive down the street, everyone stops and turns their head. Car designers devote much energy to creating exciting, aesthetically pleasing body styles. One designer has observed that it costs no more to manufacture a car with a beautiful design. Car designers work very hard to develop three dimensional body lines and curves that are striking and pleasing to the eye. Body lines can also strengthen the structure of a car body, increasing safety and reducing weight and cost. Such beautiful car designs have captivated consumers for decades and helped fuel a major consumer industry.

Since most cars are not merely works of art but are also transportation subject to obstacles, traffic and driver error, they can be subjected to accidental damage. Many of us have had the unpleasant experience of returning to our parked car to find that a careless motorist backed into our car or opened their car door in a way that caused body damage. Anyone who has ever accidentally backed into a pole or other obstruction or has been involved in a minor accident knows how disheartening it can be to subject a beautiful and finely crafted automobile to damage. Where before there was mirror-shiny clear coat, sleek lines and curves, there now is an unsightly scratch or dent.

Generally speaking, there is a well-defined process for making most kinds of mechanical repairs to motor vehicles, the list of replacement parts and supplies can be defined in advance, and most repair jobs of that particular type are similar. Often, standard charges may apply. As an example, the mechanic time for removing the engine cylinder head on a particular model of vehicle and replacing it with a reconditioned cylinder head can often be accurately estimated in advance. Similarly, reconditioning worn brake rotors and replacing brake pads is a standard operation, and it is easy for a repair shop to estimate how much time would be involved and the cost of replacement parts.

It is much more challenging to accurately estimate the cost and amount of time it will take to repair body damage to a motor vehicle and to then properly execute on such repair direction. The position, size, shape and severity of each dent on a car's body is unique. Any repair needs to be both structurally sound and aesthetically pleasing. For example, it is important when looking down the length of the vehicle that body lines are unbroken and undeformed. The smallest deformation on a body line can be easily noticed. While a range of standard techniques can be applied to repair dents and other body damage, due to the aesthetic considerations involved, authorizing repair of and properly repairing body damage is a craft that can be art as well as science.

One might think that the cost and amount of effort involved in pulling or hammering out or otherwise repairing a dent would merely depend on the size of the dent. However, it turns out that dents in some places on the vehicle are easier to pull out or otherwise repair than dents in other places. See e.g. FIG. 1 which shows a conventional example vehicle quarter panel 10. The quarter panel 10, as is well known, may be composed of steel, aluminum, fiberglass, plastic or other conventional material. It is cut out and stamped in a three-dimensional shape that allows it to fit easily and properly on a motor vehicle body to provide an aesthetically pleasing appearance as well as to protect the vehicle, tire and driver. The quarter panel 10 in this example includes a variety of relatively flat surfaces such as 12 and 14. In addition, quarter panel 10 may include curved surfaces 16 as well as various body lines such as a belt line 24 and additional lines or creases 26, 28, 30. These lines or creases affect the appearance, proportions and stance of the car and add to the strength of the panel. In particular, body lines, creases and bends in the metal of such a panel can add structural strength to the panel, allowing thinner metal to be used and thereby decreasing manufacturing cost, weight and environmental load while increasing fuel economy.

Still additionally, the example quarter panel 10 shown in FIG. 1 includes so-called "work hardened" areas 18, 20, 22 that comprise bent or worked metal. For example, complex shaped portions 18, 20, 22 are typically created by cold working or stamping the metal, which can, as is well known, lead to work hardening. Work hardening, also known as strain hardening or cold working, is the strengthening of a metal by plastic deformation. Auto body parts made of metal such as steel and aluminum when worked to create bend, contoured and/or curved aesthetically-pleasing surfaces such as 18, 20, 22, may be work hardened, strengthening the metal in the places where the metal was worked. Such strengthening by cold working or cold forming adds structural strength to the panel and can produce aesthetically-pleasing 3D surfaces that are stronger than unworked metal but which may become brittle and resistant to further plastic deformation. Damage to such work hardened areas can cause cracking, resulting in loss of integrity of the panel (e.g., cracking, holes, etc.) and can complicate any repair process. Thus, work hardened areas are usually more difficult to repair than flat areas. It can be appreciated from the FIG. 1 example quarter panel that the same point impact administered to different parts of the quarter panel may result in very different damage scenarios requiring different repair solutions that may be more or less time intensive and risky to the integrity of the structure.

Perhaps because of these uncertainties, producing estimates for body damage repair can be challenging. The cost of the same repair can vary radically depending on who you talk to. Three body shops may give three very different cost estimates for repairing the same dent. Insurance adjusters and fleet operators, on the other hand, need to be able to accurately and objectively estimate how much time it will take and how much it will cost to repair particular dents at particular positions on particular cars. It would also be highly desirable for computer-assisted technology to automatically recommend a particular method of repair (e.g., paintless dent repair).

The first step in assessing and estimating a repair is usually to perform a visual and other inspection. In the past, repair inspections were often performed manually using preprinted forms. An inspector would work from a form or check list on a clipboard as he or she visually inspected the item. Defects would be noted on the form. Sometimes, such forms would include schematic illustrations (e.g., line drawings) of the item being inspected so the inspector could note location and type of damage. Such forms could be mailed or transmitted electronically by facsimile or email. Damage assessments could be made by comparing information noted on the form with standard damage assessment information. In the case of motor vehicles, for example, the inspector or other person could consult a standard source to determine the fair market value of the vehicle based on the condition of the vehicle, the options installed and other factors. Unfortunately, because every dent is unique, it is rarely possible to obtain completely accurate dent repair times and costs merely by referencing a book or an historical database.

Yet, an important capability for any motor vehicle or other item assessor is to be able to accurately estimate the cost of repair and amount of time it will take to repair. As anyone who has ever taken a car to a repair shop knows well, being presented with a repair bill that is much higher than what the inspector or technician estimated at the beginning of the process is an unwelcomed surprise. Consumers are also unhappy when the repair is not done on time. On the other side of the coin, it is important for repair facilities to be properly compensated for their time and effort and be given enough time to complete the job. One cannot expect a good job if the body shop or other repair facility is forced to work too fast and/or at bargain rates. Body shops thus have a strong interest in providing accurate cost estimates. Estimating too high can cause the consumer to go elsewhere. Estimating too low can mean the price may not be enough cover the cost of repairs and the shop could lose money on the job. Inaccurately estimating how much time it will take or what will be involved in making a repair can leave everyone dissatisfied.

In most body shops, a well-trained estimator makes an appraisal of the vehicle damage and determines what must be done to repair the vehicle. Generally, this person must be well versed in how cars and trucks are made and repaired, and be good with numbers, computers and communicating with people. Computers are often used to streamline estimating and parts identification and ordering. See e.g., Duffy, Auto Body Repair Technology (4$^{th}$ Ed. 2003). Nevertheless, accurately estimating the amount of labor involved in making a particular repair has in the past relied heavily on the experience and expertise of the human estimator.

The problem is compounded by the variety of different techniques including paintless dent removal that have been developed to repair dents and other body damage. Some techniques may be right for some dents but not others. Some jobs require parts to be removed while other types of damage can be repaired in place. While an experienced body shop can often provide a good cost and labor estimate, inspectors who have never worked in a body shop may have difficulty accurately estimating what it will take to repair particular dent damage. Yet, having to get a separate estimate from one or more body shops or other estimators may take too much time or otherwise be inconvenient, especially in fleet or auction environments where time and efficiency are important. Additionally, it is useful to employ objective rather than subjective standards for assessing damage and recommending necessary repair procedures, costs and work time.

Some in the past including the assignee have proposed to use computers and computer systems to gather automobile inspection information and assess damage. See for example US 20070293997. Various systems and techniques have been developed. However, further improvements are possible and desirable. In particular, it has been found to be a challenge in the past to apply objective standards to what some treat as a subjective, highly experiential process for estimating what it will take to repair depression type damage to items including but not limited to body portions of motor vehicles.

One example non-limiting technology uses programming and data based in part on a significant amount of time and effort analyzing case studies in order to isolate and distill an optimal set of criteria. Such automatic computer-assisted technology can prompt an inspector in a structured manner through a user interface to input such criteria (e.g., by presenting a series of questions with structured possible answers for user selection) to enable a data processing system to automatically, objectively estimate the time and cost involved in repairing dents and other depression damage and the like. The system automatically takes into account that while size (length and width) of the dent are important, there are other objectively observable factors (e.g., number of work hardened areas, number of panel edges, number of body lines in dent, dent depth, and other adjustments) that together can be used to automatically enable a very accurate assessment and calculation of what should be done and how much time it will take for a skilled body repair technician to repair a particular dent.

Exemplary illustrative non-limiting implementations provide a data processing system including non-transitory memory storing an integrated software suite and/or operative as a standalone module or application that provides or assists with vehicle inspection or other damage assessment. One exemplary illustrative non-limiting implementation includes an inspection application that runs on for example a desktop, laptop, or pen-tablet PC's; a centralized server application that handles data synchronization between the database and the inspection PC's; additional systems to handle reporting and data transfer; and a web front end to allow clients to view vehicle inspection results on the Internet.

Example Seller Grade

Additional example technology enhances the capture of a vehicle's overall condition by improving the current damage values, and adding a new seller grade. The Seller grade can be leveraged at an auction or other live sales environment for simultaneously or simulcast display, and the interface can be robust enough to be used by for quick inspections inside the auction gate.

In one example embodiment, Seller grade may provide the ability to add additional damage information in order to calculate a grade for the vehicle. Based upon the damage information entered by the dealer, a Seller Grade can be provided. The Seller Grade can be rounded to half numbers for example. The example non-limiting system can provide a vehicle grade, and utilize the grading algorithm in a manner that can be used by other industry vendors and clients. One example non-limiting feature provides an external facing Webservice that allows the passing of predetermined information that calculates and returns a vehicle grade.

BRIEF DESCRIPTION OF THE DRAWINGS

These and other features and advantages will be better and more completely understood by referring to the following detailed description of exemplary non-limiting illustrative implementations in conjunction with the drawings of which:

FIGS. 1C-1, 1C-2 is an example prior art condition report;

FIG. 1C-3 is an example of a seller grade condition report;

FIG. 2 shows an exemplary illustrative non-limiting block diagram of an inspection system architecture;

FIG. 3C shows an exemplary illustrative non-limiting coordinate map for a four-door sedan exterior image;

FIG. 6 show an exemplary illustrative non-limiting set of database records representing a combination of part, damage, severity, action, and (optionally) special condition;

FIGS. 13A-13C show example panel damage user interface screens;

FIGS. 14A-14C show example bumper damage user interface screens;

DETAILED DESCRIPTION

Figure 1:
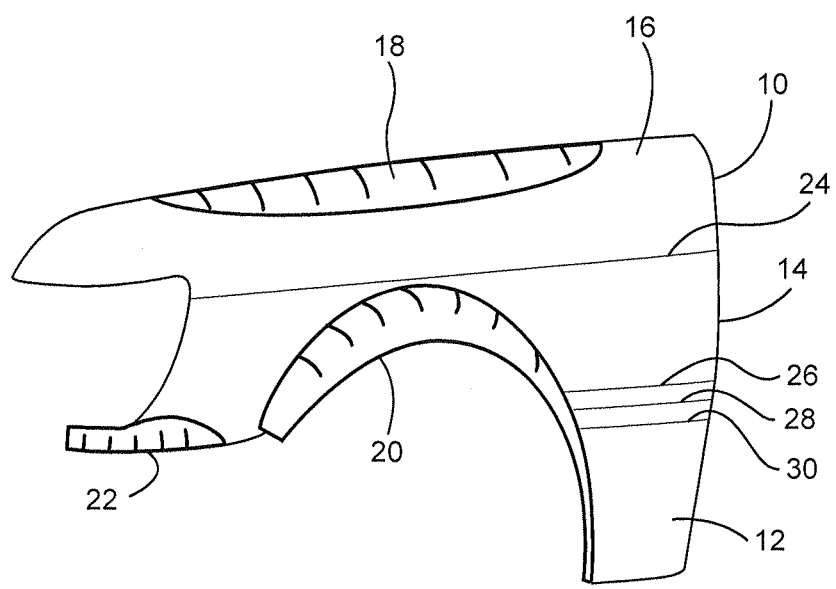
FIG. 1 shows an example prior art quarter panel.
Figure 1A:
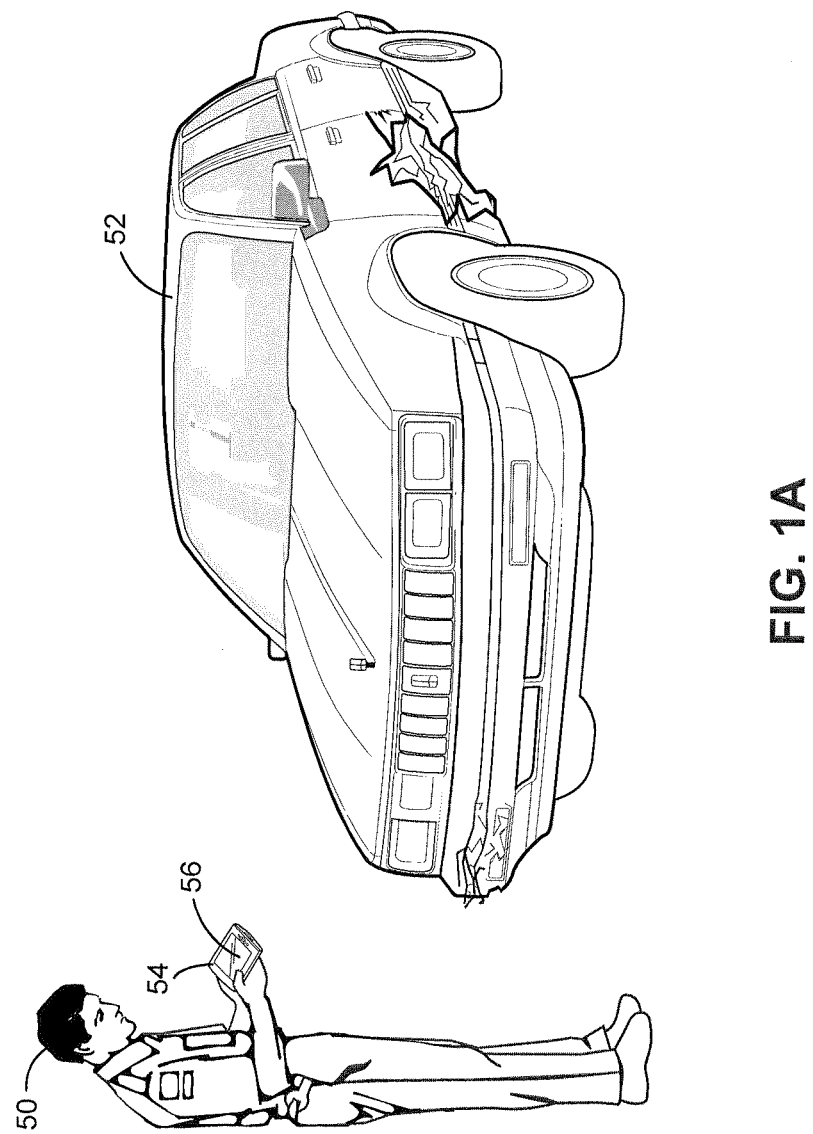
FIG. 1A shows an exemplary illustrative non-limiting motor vehicle inspection scenario.

FIG. 1A shows one example illustrative non-limiting inspection scenario and system that the exemplary illustrative non-limiting technology can be integrated into. In the FIG. 1A example, an inspector 50 uses a portable computer-based inspection appliance 54 having a touch or other display screen 56 to inspect a motor vehicle 52. The motor vehicle 52 can be any type of motor vehicle such as for example a passenger car, a light truck, a heavy truck, construction equipment, a motorcycle, a boat or other watercraft, an airplane or other aircraft, or any other type of motor vehicle. The technology herein is not limited to motor vehicles, but can be applied to any type of item requiring inspection or other examination to isolate and detect flaws, defects, damage, features, options, or any other physical or other characteristics—and in particular dents.

In the FIG. 1A example shown, a human inspector 50 is physically present at the site of the motor vehicle 52. The inspector 50 visually inspects the motor vehicle 52 for features and damage. Such inspection can in one non-limiting implementation be relatively comprehensive and include or provide for example information concerning any or all of the following:

Exterior:
Frame or structural damage due to collision
Collision repairs that are below industry standards
Significant dents, dings, and scratches in body, bumper, elsewhere including detailed assessment of how to repair them, how much it will cost and how much time it will take
Missing or broken components including glass and mirrors
Operation of exterior lighting
Abnormal wear and condition of tires (includes spare)
Document tire size, brand and amount of tread remaining on each tire
Significant damage to wheels and/or hubcaps
Other
Interior
Document all accessories
Verify proper operation of all factory equipment
Significant damage to seats, carpets, headliner, sun visors, trim pieces, dash and console areas
Missing or broken items
Evidence of flood or water damage
Other
Chassis
Damage or wear to exhaust system, steering system, shock absorbers, struts and CV boots
Transmission, differential or power steering leaks
Evidence of frame or structural damage due to collision
Other
Engine
Significant oil or coolant leaks
Condition of fluids
Belts and hoses for wear or need of replacement
Serious mechanical problems indicated by abnormal noises, evidence of overheating, poor running condition or exhaust smoke
Missing or damaged components
Other In the exemplary illustrative non-limiting implementation, a computer-based handheld inspection input appliance 54 may guide human inspector 50 in conducting the inspection and/or the appliance may collect and record the inspection data by receiving inputs from the human inspector. In the example shown, the input device 54 can be small enough to hold in one or two hands, allowing the inspector 50 to carry the device with him or her as the inspector walks around the vehicle, steps inside the vehicle, and crawls beneath the vehicle. The input device 54 may, as detailed below, be equipped with one or more cameras to capture images of the vehicle including damaged areas. Such images can be automatically analyzed in some embodiments to automatically ascertain parameters concerning the type and extent of damage. Such automatically-sensed damage parameters can be used to supplement additional information the inspector 50 manually inputs into the input device 54.

In one exemplary illustrative non-limiting implementation, input device 54 is equipped with a touch screen 56 that displays information for inspector 50 to see, and also allows the inspector to input information graphically, through gestures and by other means. For example, the inspector 50 may use a stylus or a finger to actuate virtual buttons displayed on touch screen 56, draw or otherwise indicate graphical information, or perform other data input operations. The use of a handheld touch screen based tablet computer for inspection appliance 54 is a non-limiting example—other inspection appliance configurations might include for example personal digital assistants, laptop computers, desktop computers, wearable computer(s), cellular telephone type devices, or any other portable or non-portable electronic device capable of receiving, processing, storing and/or presenting information. Pointing or other menu or data selection may be accomplished by a computer mouse controlling a cursor, touch screen pointing and gestures, a stylus, or any other conventional or convenient means.

In the exemplary illustrative non-limiting implementation, the inspection appliance 54 provides a graphical user interface (GUI) that is easy to use and guides the inspector 50 through the inspection process. This graphical user interface may, in the exemplary illustrative non-limiting implementation, be customized based on who the inspection is being performed for, the purpose of the inspection, and/or other factors. For example, inspections performed for vehicles coming off long term lease may be different from inspections performed by car rental companies to determine possible damage during daily or other short term leases. Similarly, different fleet operators may have different inspection needs and requirements. Inspections performed for motor vehicles 52 that have been repossessed may have different requirements from those vehicles that were traded in at a dealership and remarketed. The exemplary illustrative non-limiting inspection appliance 54 may store various different inspection rules and profiles, and use them to customize the process flow, dialogues and other aspects of the displayed or otherwise presented user interface to guide inspector 50.

An example non-limiting process for conducting an inspection is detailed below. Once the inspector 50 is finished with an inspection, the inspection appliance 54 may validate the inputted information for internal consistency and/or compliance with rules. The inspection appliance 54 may, for example, warn the inspector that he or she has forgotten certain information or has entered it incorrectly. Such inspection validation procedures may save time (the inspector does not have to return to re-inspect the vehicle) and/or ensures more complete and accurate information.

The inspector 50 can use a digital camera or other imaging device to capture images of the vehicle 52 being inspected. Such a digital camera or other imaging device can be connected to (or may be an integral part of) inspection appliance 54. Inspection appliance 54 can store such captured images (e.g., of dent damage) along with other collected inspection information.

Inspection appliance 54 may include a damage or value calculation function that automatically compares the condition of vehicle 52 with internally stored standards. For example, the inspection appliance 54 may contain a fair market "blue book", Mitchell Collision Estimating & Reference Guide and/or other valuation data as well as algorithms for discounting or enhancing valuation based upon damage, options or other characteristics. Inspection appliance 54 may generate a condition and/or report estimating how much it will cost and what it will take to repair, that can be displayed on touch screen 56, transmitted to a printer or other rendering means via wireless or wired connections, or otherwise stored and/or presented.

In one exemplary illustrative non-limiting implementation, a portable inkjet or other printer may be connected to the inspection appliance 54 (and/or may be integral with it) to provide a written inspection report. In other example implementations, 802.11 WIFI or other wireless or wired connectivity can be used to communicate collected inspection information from the inspection appliance 54 to other nodes or locations such as a remote processing system including a non-transitory storage device storing a database.

Example Portable Inspection Appliance

Figure 1B:
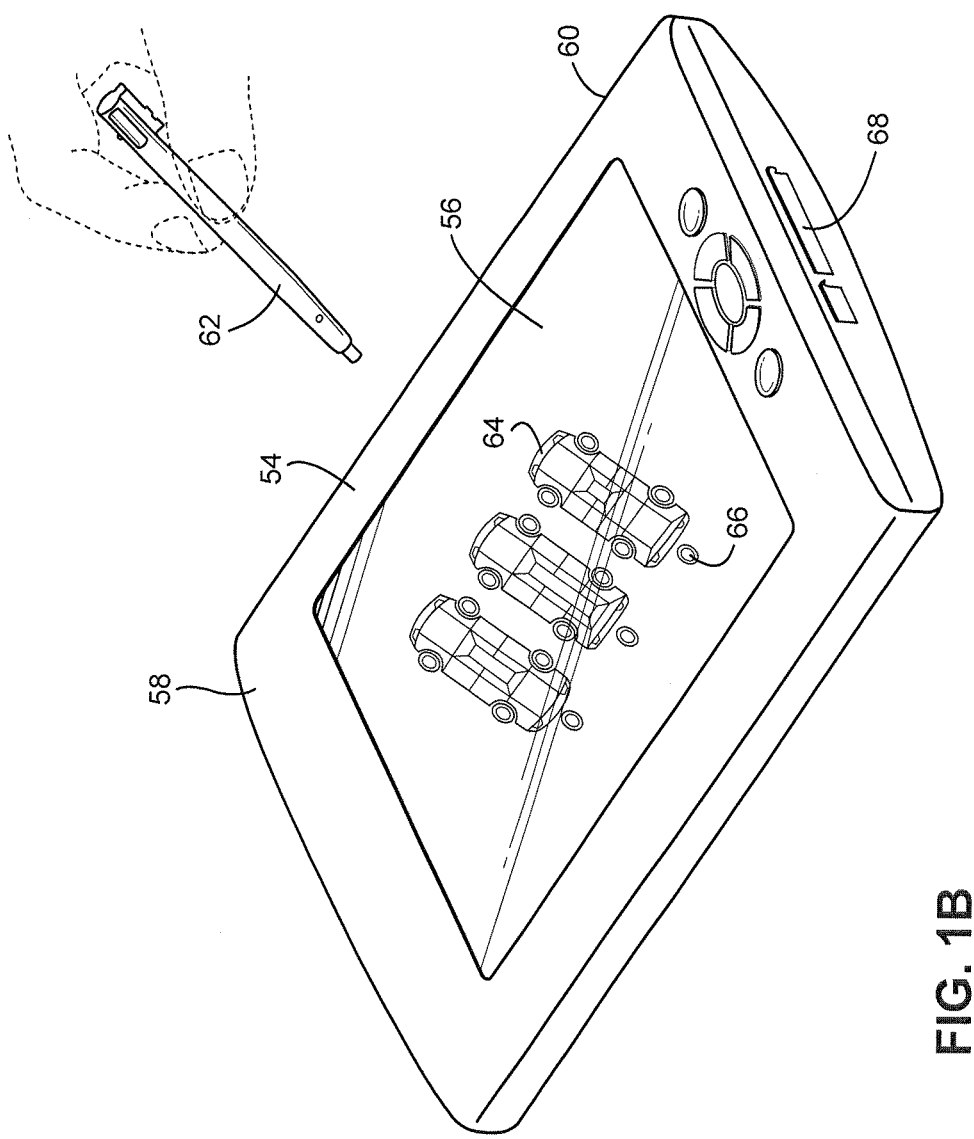
FIG. 1B shows an exemplary illustrative non-limiting touch screen based inspection input appliance.

FIG. 1B shows one example illustrative non-limiting handheld inspection input appliance 54 including a touch screen 56. Inspection appliance 54 may comprise, for example, a conventional commercially available tablet computer such as an iPad including a handheld, portable housing 58 containing an internal battery operated power source. The internal battery power source may be replaceable and/or rechargeable. Such a handheld portable inspection appliance 54 may include, in addition, user input controls 60 such as for example, buttons, knobs, keys, keyboards, directional controls, microphones and/or other input devices. A stylus 62 can be placed in contact with the touch screen 56 to indicate positional information. The inspection appliance 54 may provide corresponding visual feedback in response to stylus 62 or finger positioning including, for example, color changes, gesture tracing, dialogue boxes and other visual, aural and/or other feedback. In one exemplary illustrative non-limiting implementation, inspection appliance touch screen 56 may display textual information, graphical information, or a combination of textual and graphical information.

In the particular non-limiting example shown, the touch screen 56 is displaying schematic graphical line drawing type illustrations 64 of several different motor vehicles. The inspector 50 can select an appropriate line drawing by, for example, marking a selection bubble 66 using stylus 62, or the appropriate line drawing can be selected and automatically displayed based on vehicle identification number decoding (described below) or other input. Inspector 50 may also indicate location of dents, scratches and other damage by placing the tip of stylus 62 onto a corresponding location on the displayed schematic illustration 64. Inspection appliance 54 can provide visual and/or aural feedback, and may collect information in a variety of other ways including for example voice logging, image capture, automatic scanning or any other desired means.

The exemplary illustrative non-limiting inspection appliance 54 may include a bidirectional port 68 for use in communicating information via the outside world. Port 68 may comprise a wireless adapter (such as WIFI, WLAN or any other radio or other wireless based connection), a wired connection such as a modem, Ethernet network interface card, a parallel or serial data connector, or any other means of communicating electrical or electronic signals. Port 68 in the exemplary illustrative non-limiting implementation is used to both input information to the inspection appliance 54 and to communicate information collected by the inspection appliance to the outside world.

The FIG. 1B configuration for appliance 54 is one non-limiting example—any other desired portable or non-portable computing device configuration can be used instead or in addition. For example, a smart phone, an IPAD, a desktop, a tablet computer, or any other suitable computing platform with input/output/display capabilities may be used. Computation capabilities can be local, remote or a combination. In some configurations, appliance 54 may comprise a simple "dumb" terminal or thin client type device comprising an input means, a display means and a communication means. In other configurations, appliance 54 may comprise a complete, self-sufficient standalone computing device with internal processing, storage, communication and other capabilities. Hybrid or distributed computing implementations are also possible.

Example Inspection Process

Figure 1C:
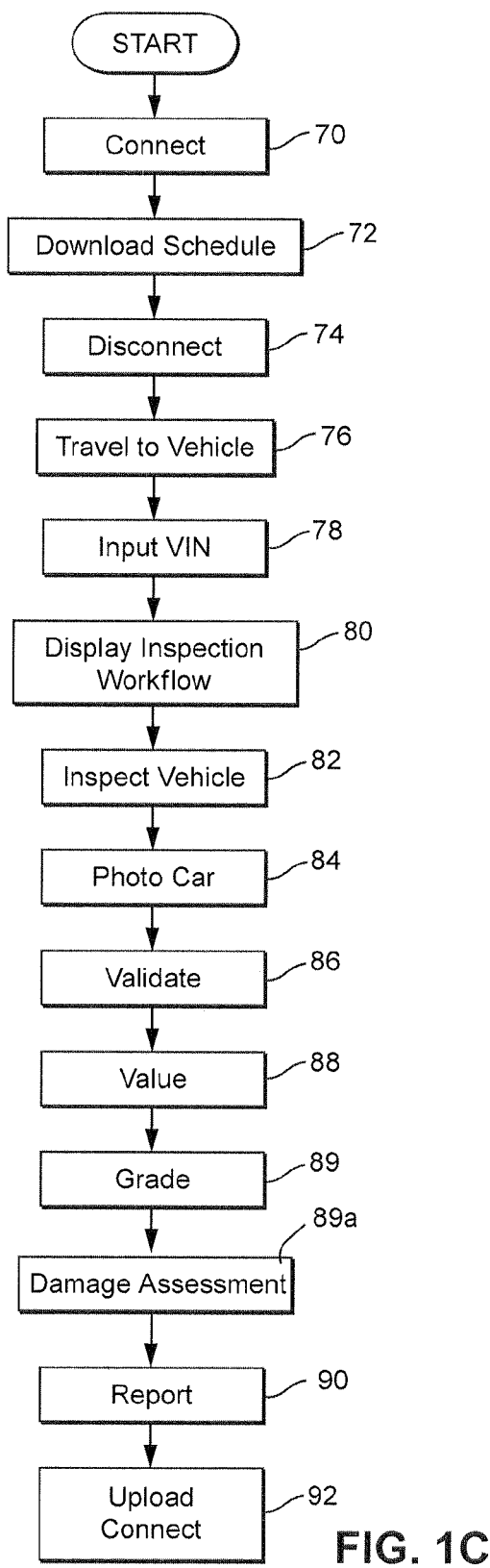
FIG. 1C is a flowchart of an exemplary illustrative non-limiting overall inspection process.

FIG. 1C is a flowchart of an example inspection process. At the beginning of a work period, human inspector 50 connects appliance 54 to a network (to be described below) to receive a download including workflow, software updates, rules updates and other information (blocks 70, 72). The workflow may include for example a schedule of cars to inspect for which client at which locations. The inspector 50 may now, in some exemplary illustrative implementations, disconnect appliance 54 from the network (block 74) and take the appliance to the site of a vehicle 52 to be inspected (block 76), or the information can be wirelessly accessed and downloaded in real time on demand.

At the inspection site, the inspector 50 may input the vehicle identification number (VIN) into appliance 54. Such a VIN may be input (manually, via bar code recognition using a camera mounted on device 54, etc.) based on an "add new work" request that inspector 50 commands appliance 54 to perform—which may start a "wizard" that automatically takes the inspector through various steps including for example specifying location (e.g., can prompt for auction or vehicle location), input VIN (which will be decoded to figure out what kind of vehicle, etc.). The appliance 54 can in some non-limiting examples automatically decode the VIN in the exemplary illustrative non-limiting implementation to determine the type (make, model) of vehicle (e.g., SUV, passenger car, light truck, etc.), or such information can be manually inputted. The previously downloaded workflow information also specifies which inspection client the inspection is being performed for if applicable. Based on this information (as well as potentially other information), the inspection appliance 54 automatically determines, based on previously downloaded/stored rules and a "rules engine", what inspection protocol and workflow to follow.

The inspector 50 then typically performs a relatively rigorous inspection of the vehicle 52. Such inspection can include, for example, standing at the left front fender and looking down exterior of the car at a shallow angle to see dents, scratches and other defects. The inspection 50 may also, for example, "walk" the entire car, looking for dents and other imperfections from every angle (including the roof). This procedure allows the inspector 50 to have a general overall view of car to detect any collision or other damage.

The inspector 50 typically also conducts a much more detailed inspection—for example, getting down on his hands and knees and looking for undercarriage damage, axle, wheels, etc. Part of this inspection process in the example implementation involves carefully observing and measuring characteristics of depression type damage such as dents in body panels, bumpers, etc. Each time the inspector 50 finds damage, he inputs it into the inspection appliance 54 by use of touch screen 56. As the inspector 50 walks around the car 52, he uses the stylus or his finger to touch the touch screen of appliance 54 to interact with the internal executing software and input damage information. The inspector 50 also notes options on the car and inputs this information into the appliance 54. The inspector 50 then opens the door of the vehicle, and carefully inspects the interior of the car, using appliance 50 to note all interior options, and damage (e.g., including color, cleanliness, odors, etc.).

During the inspection or once the visual inspection is complete, inspector 50 uses a digital camera to photograph the vehicle (block 84). Such photographs can include for example odometer, VIN plate, trunk, actual damage including dents, and any other desired views (in one non-limiting example, which photos the inspector takes can be client-specific based on what the client wants). The inspector 50 may connect the digital camera to appliance 54 (or use a camera embedded in the appliance) and use embedded software to assign the photos to correct image locations in a draft condition report the appliance is preparing.

In the exemplary illustrative non-limiting implementation, appliance 54 may then validate the inputted information (block 86)—generating any exception warnings if the inputted inspection information is incomplete or inconsistent. The appliance 54 may also calculate a value for the inspected vehicle 52 based on stored valuation information (block 88).

Appliance 54 may also assign the vehicle an overall "grade" (block 89) based on a rules engine—with grading rules being customized based on who the inspection is being prepared for, the type of inspection, or other factors. In more detail, commonly-assigned U.S. patent application Ser. No. 11/421,320 filed May 31, 2006 discloses an AutoGrade feature that, when executed by an automatic inspection system, automatically assigns a grade to the vehicle being inspected. Such AutoGrade service may pass an Item, Damage, Severity, and Action field from a Condition Report. Based upon the combination of these 4 items, a pre-specified amount of grading points are assigned and calculated to achieve a total. This point total is then matched to a grading table to determine a final AutoGrade. Such an AutoGrade quantity is useful in providing a quantized, easy-to-understand numerical parameter indicating overall vehicle condition. See Table I below:

TABLE I

| 2 Character Numeric Grade | Block Summary 3 Character Numeric Grade | Definition |
| --- | --- | --- |
| 50 | 5.0 | Extra Clean |
| 49 | 4.9 | Clean |
| 48 | 4.8 | Clean |
| 47 | 4.7 | Clean |
| 46 | 4.6 | Clean |
| 45 | 4.5 | Clean |
| 44 | 4.4 | Clean |
| 43 | 4.3 | Clean |
| 42 | 4.2 | Clean |
| 41 | 4.1 | Clean |
| 40 | 4.0 | Clean |
| 39 | 3.9 | Average |
| 38 | 3.8 | Average |
| 37 | 3.7 | Average |
| 36 | 3.6 | Average |
| 35 | 3.5 | Average |

TABLE I-continued

| 2 Character Numeric Grade | Block Summary 3 Character Numeric Grade | Definition |
|---|---|---|
| 34 | 3.4 | Average |
| 33 | 3.3 | Average |
| 32 | 3.2 | Average |
| 31 | 3.1 | Average |
| 30 | 3.0 | Average |
| 29 | 2.9 | Below Average |
| 28 | 2.8 | Below Average |
| 27 | 2.7 | Below Average |
| 26 | 2.6 | Below Average |
| 25 | 2.5 | Below Average |
| 24 | 2.4 | Below Average |
| 23 | 2.3 | Below Average |
| 22 | 2.2 | Below Average |
| 21 | 2.1 | Below Average |
| 20 | 2.0 | Below Average |
| 19 | 1.9 | Rough |
| 18 | 1.8 | Rough |
| 17 | 1.7 | Rough |
| 16 | 1.6 | Rough |
| 15 | 1.5 | Rough |
| 14 | 1.4 | Rough |
| 13 | 1.3 | Rough |
| 12 | 1.2 | Rough |
| 11 | 1.1 | Rough |
| 10 | 1.0 | Rough |
| 0 | 0.0 | Extra Rough |

NOTE:
Anything less than a 1.0 is considered a 0.0

The inspection system can be programmed to similarly provide a parameterized grade to the vehicle for purposes of seller grade in sales environments such as auctions. The seller grade purpose may be somewhat different than for other users of AutoGrade, so the type of grade that would be useful for seller grade may be somewhat different than what might be most optimal for other purposes. For example, the inspection can be performed by the seller himself and can be quicker and the precision of the parameter provided could be decreased to provide a simpler quantity rounded to whole numbers as shown below:

Example Seller Grade

| 2 Character Numeric Grade | 3 Character Numeric Grade | Definition |
|---|---|---|
| 46 to 50 | 5.0 | Extra Clean |
| 41 to 45 | 4.5 | Clean |
| 36 to 40 | 4.0 | Clean |
| 31 to 35 | 3.5 | Average |
| 26 to 30 | 3.0 | Average |
| 21 to 25 | 2.5 | Below Average |
| 16 to 20 | 2.0 | Below Average |
| 11 to 15 | 1.5 | Rough |
| 6 to 10 | 1.0 | Rough |
| 0 to 5 | 0.0 | Extra Rough |

To provide such a seller grade, a configuration for use with the handheld 54 inspection application described above contains a list of questions that are automatically presented to the inspector on the touch screen 56 for completion. In this case, the inspector might be inside the gate of an automobile auction facility, and use the inspection system described above to perform a quick but accurate inspection for purposes of seller grade. In such environments, potential purchasers of the vehicle or their agents are often (but not always) on site and so can inspect the vehicle for themselves. Accordingly, one purpose of a "seller grade" inspection is to ensure that the seller has apprised potential purchasers of basic defects and condition to protect the seller in the event a buyer has buyer's remorse and wishes to renege on the purchase agreement. In other contexts, the seller may wish to go further and disclose detailed information about the condition of the vehicle so the purchaser is fully informed irrespective of his own ability to inspect the vehicle (e.g., in online or remote purchasing opportunities where the buyer is not on site and is unable to inspect the vehicle himself).

In one example implementation, an AutoGrade mapping table converts the damage inputs the inspector provides using handheld input appliance 54 to damage information that can be used for grading. The Seller Grade can utilize the same basic application logic described in the prior patent application noted above to calculate the Seller Grade. An additional computerized service is also provided between the party passing in information and information that is being passed into the current AutoGrade service. This new service accepts the Item, Damage, and Severity from an outside source, and then maps it to an Item, Damage, Severity, and Action, which will then be passed into the AutoGrade service. Based upon the data provided, the AutoGrade Service sends a grade back which will then be rounded up or down, based upon predetermined Seller grading parameters. Once this grade is determined, it is then passed back to the outside source.

To provide such functionality, a configuration for the mobile inspection application contains a list of grading questions that the inspector needs to complete, Such a standardized data collection process can be called the Mobile Inspector App (Mi). This application guides a user through a virtual walk around of a vehicle using simple on-screen instructions and a detailed, pre-defined and customized process, resulting in data collection.

In addition, the system uses an AutoGrade mapping table to convert the damage inputs from handheld touchscreen device 54 to damage information that can be used for grading.

The process can for example start one of three ways:

1. The dealer can create a Seller grade using a handheld application on handheld device 54

2. A third party vendor assigned by the dealer can create a Seller grade using the handheld (or other) application 3. An inspector inside the gate of an auction can create a Seller grade using the handheld (or other) application In one example non-limiting implementation, there are 3 types of Seller grades Available:

1. Basic: Frame Damage or Prior Paint—No Seller Grade will be generated

2. Enhanced: Seller grade will be displayed based upon limited data

3. Detailed: Seller grade will be displayed based upon detailed data.

Once the Seller grade is completed in the handheld application by an inspector, the seller himself, or another person such as an auction employee, the handheld application calls a Webservice on an external server and passes in all the Item and Damage combinations. The Webservice maps these combinations to valid values and passes this data to the AutoGrade service. The Webservice will then accept the grade back from the AutoGrade service and round the grade prior to passing it back to the handheld application. The handheld application will include the grade on the report(s) outputted at the conclusion of the inspection process (see FIG. 1C-3 for an example condition report). A bulk upload process can be used that accepts a CSV or other formatted file which is updated to accept a grade.

One example implementation utilizes the Item and Damage portion of this information, and lists all Severity's as NULL. This example non-limiting implementation uses a mapping table that only contains Item and Damage to be mapped to an Item/Damage/Severity and Action table which will then be passed to AutoGrade. While this particular handheld application uses the Item and Damage combination to determine a seller condition grade, other example implementations may require an Item, Damage and Severity (or other) combination so this service is built to accept all three parameters.

Major components of the example implementation include:

an external facing Webservice that will allow the passing of predetermined information that will in turn allow a remote processor to calculate and return a grade.

a Mapping Table/Service that contains Item, Damage and Severity fields to be mapped to an Item/Damage/Severity and Action values which will then be passed to AutoGrade.

An authentication functionality in order to verify request from the handheld device that will be used to tell the service which data mapping will be used A generic authentication functionality to be used if future applications other than handheld device use this application.

An example Mapping Table contains vendor, Item, Damage and severity fields to be mapped to an Item/Damage/Severity and Action value which will then be passed to AutoGrade. Such a table may have the following values:

Vendor
Item
Damage
Severity
AutoGrade Item Description
AutoGrade Item code
AutoGrade Damage Description
AutoGrade Damage Code
AutoGrade Severity Description
AutoGrade Damage Code
AutoGrade Action Description
AutoGrade Action Code In one example implementation, all Seller grade damage combinations are mapped to a single AutoGrade combination based on vendor value. In this example implementation, the Seller grade damages need not be valid AutoGrade damages and need to be mapped, one-to-one, to valid AutoGrade values in order to correctly calculate a grade. This mapping is done in a table to allow for easy maintenance. A web service between the current AutoGrade service and the Seller grade application maps the damages supplied by the Seller grade to valid AutoGrade values, pass these into the AutoGrade service and then return a 'seller grade' back to the Seller grade application. Such a webservice to map damage entries may:

Provide service to accept condition information via web service call

Utilize mapping table to determine the AutoGrade records mapped to each condition Call the AutoGrade web service and pass in valid AutoGrade damage values Consume the AutoGrade from the service and return the grade to the requestor.

To implement such an arrangement, the ability to pass mapped values into the AutoGrade Service is provided. Software is also provided with the ability to round the Grade using a grade rounding table based on the table above. In one implementation, the ability is provided to pass the grade to the external Client/Vendor; authenticate functionality in order to verify request from vendor that will be used to tell the service which data mapping will be used; monitor to alert appropriate personnel if the webservice is not functioning; and provide an XML error message to be returned to the requester if an Item/Damage/Severity combination(s) is passed into the service and is not in the mapping table (error details the I/D/S that is in error).

Additionally, in one exemplary illustrative non-limiting implementation, appliance 54 (with our without the assistance of a wirelessly-connected remote processing system) is able to calculate an accurate damage assessment and associated estimate of amount of time and/or cost of repairs for the vehicle 52 being inspected (block 89*a*). For example, during the "inspect vehicle" step 82, appliance 54 may collect detailed damage information from inspector 50 of the severity and other characteristics of particular damage the inspector discovers on the vehicle 52. In one exemplary illustrative non-limiting implementation, appliance 54 can inquire from inspector 50 certain specific information about dents in motor vehicle 52 including for example:

the length/width of the dent,
the number of work hardened areas,
the number of panel edges,
the number of body lines in the dent,
the depth of the dent, and
additional damages such as sharp creases or folds, crushed metal, tears, gouges,
whether the metal is aluminum,
Other items.

Appliance 54 may then use this detailed information to accurately automatically calculate the estimated repair time, part pricing, and other aspects for repairing the dent or other defect or damage. Prevailing body shop or other hourly rates may then be applied to accurately automatically assess the cost of repairing the damage. Such objective assessment may allow even inspectors inexperienced in estimating body or other damage to develop, with the aid of appliance 54, an automatic, objectively arrived-at, accurate damage assessment and repair cost.

The appliance 54 may generate a condition report (see FIGS. 1C-1 and 1C-2 for an example prior art condition report) (block 90) which may be printed by an internal or external printer if desired and/or delivered electronically (the inspection reported actually delivered by the automated system can be much more detailed in terms of dent and other damage estimation, as will become clear below). At that time or some later time, the inspector again connects appliance 54 via wire or wirelessly) to the network to upload the inspection report and other collected information (block 92). Appliance 54 keeps track of which inspection results it has not yet uploaded, and supplies those over the network in the form of a "data synch." Such uploaded condition report information can be made available over the Internet or otherwise for viewing by the client (all inspections for a particular client obtained from all inspection appliances 54 can be aggregated and organized for easy access and display). The data synch can be two-way—i.e., the appliance 54 uploads harvested inspection information and downloads new work assignments, new rule updates, and other information. In some exemplary illustrative implementations, wireless means is used to continuously connect appliance 54 to a data network so that data synchronization can be carried on periodically or continually.

Example System Architecture

Figures 1, 1C, 2, 3:
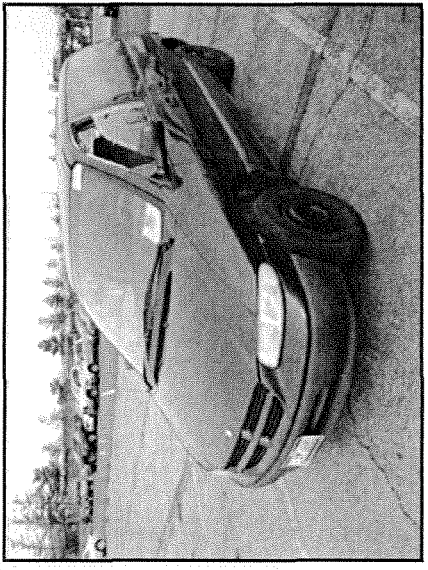

FIG. 2 shows an exemplary illustrative non-limiting overall computer system architecture 100 used to interact with inspection appliances 54. A network 102 conveys information to and from appliances 54. Network 102 can for example allow inspection appliances 54 to communicate with a computer 104 coupled to a non-transitory storage device 106 storing a database. The database stored on storage device 106 may store information including but not limited to client rules 106a, damage valuation data 106b, application software updates 106c, inspection schedules 106d, inspection reports 106e, and other information. Computer 104 (which may for example comprise or include a SQL, Oracle or other database server in one exemplary illustrative non-limiting implementation) downloads data from the database stored on storage device 106 to requesting inspection appliances 54 and uploads information from the inspection appliances 54 to the stored database. Network 102 may provide constant, periodic, occasional and/or infrequent connection between computer 104 and appliances 54 depending on need for timeliness. In one exemplary illustrative non-limiting implementation, network 102 may comprise or include a bank of modems and/or Internet routers communicating using TCP/IP or any other desired communications protocol(s). Any wireless or wired networking capabilities may be used as desired.

FIG. 2 further shows a web server 108 coupled to access the database stored on storage device 106 (or a mirrored copy of same). Web server 108 allows remotely located web browser clients 108a, 108n to access and display or otherwise process inspection reports 106e and/or other information stored within the database via network 102.

Example Appliance Architecture

Figure 2:
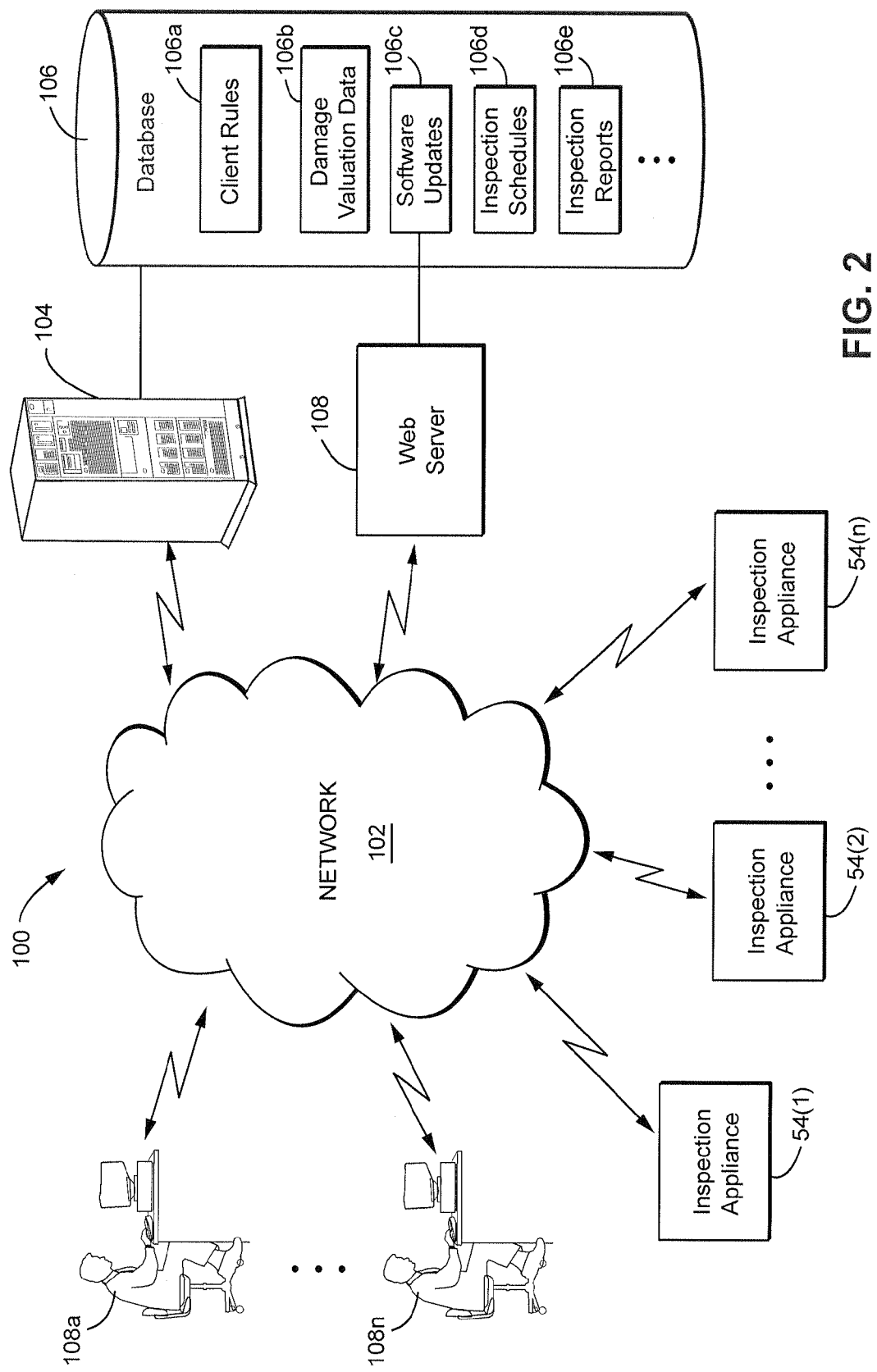
Figure 2A:
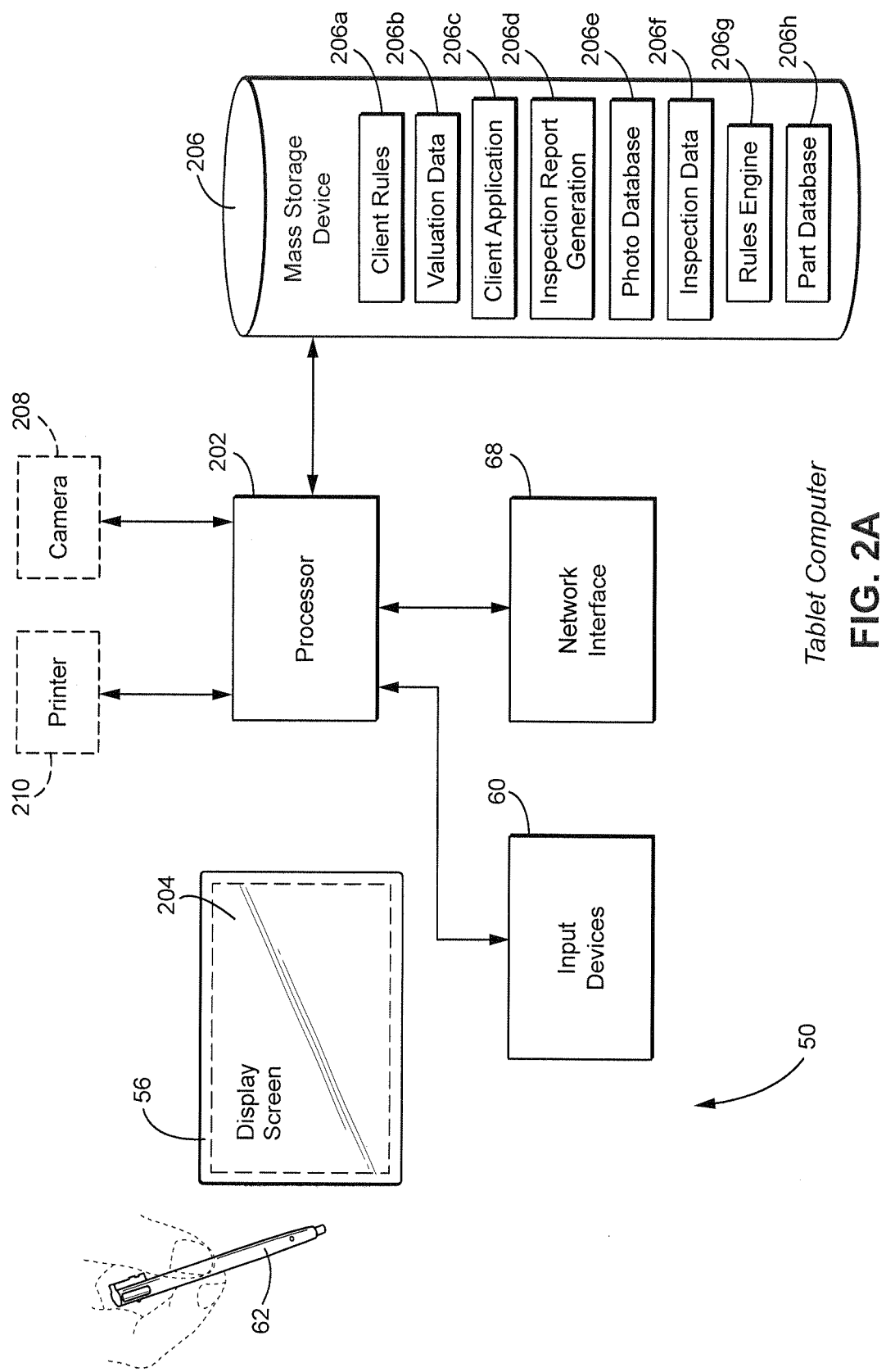
FIG. 2A shows an exemplary illustrative non-limiting block diagram of an inspection input appliance, in this particular non-limiting instance a portable tablet computer including a touch screen.
Figure 2B:
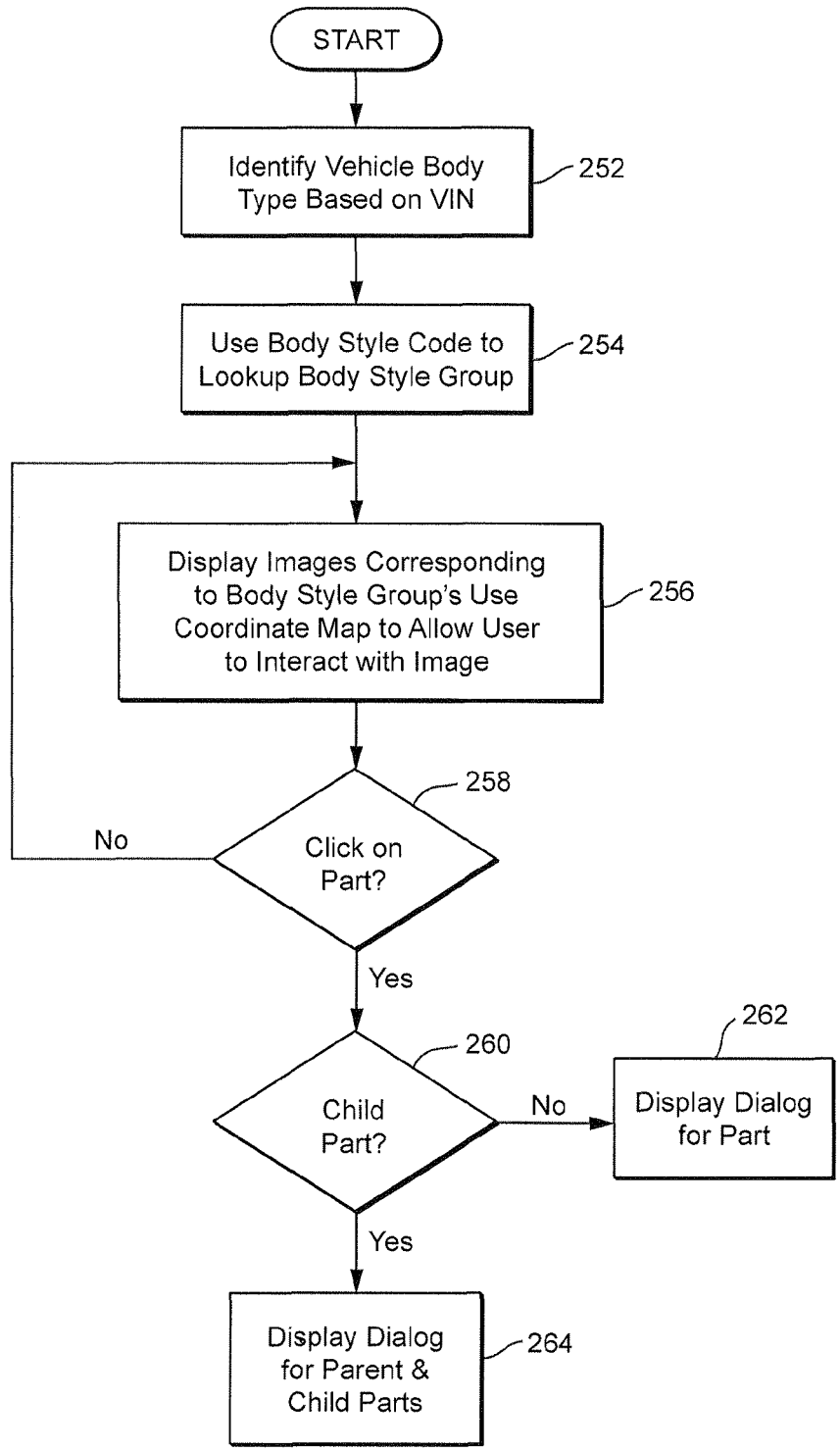
FIG. 2B is a flowchart of an example body style group classification process.
Figure 2C:
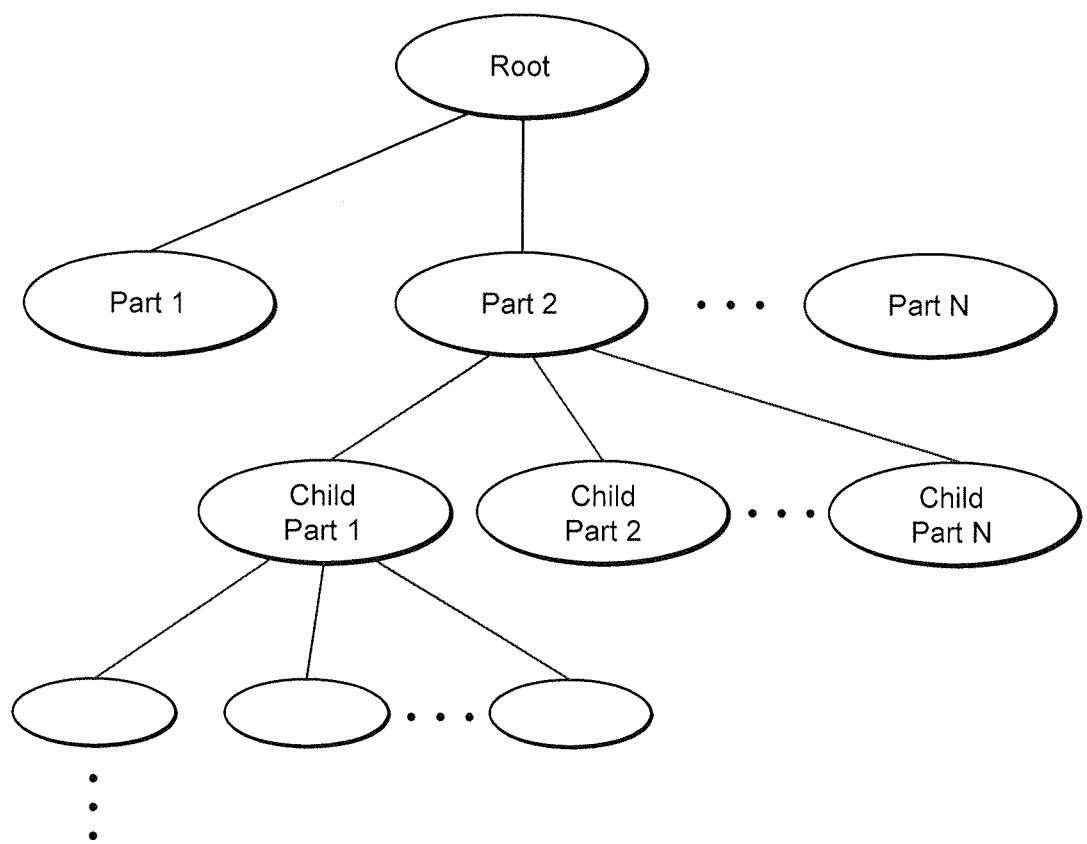
FIG. 2C is a schematic illustration of an example illustrative non-limiting hierarchical parts data organization.

FIG. 2A shows an exemplary illustrative non-limiting architecture for handheld inspection input appliance 54. A processor 202 may be used to control display screen 56 and receive inputs from a touch-sensitive portion 204 of the screen. Processor 202 may also receive input from input devices 60 and/or network interface 68. Processor 202 may also access and store information maintained on a mass storage device 206, such information including client rules 206a, valuation data 206b, client application software 206c, inspection report generation 206d, an image or photo database 206e, inspection report and other data 206f, and other information. In the exemplary illustrative non-limiting implementation, processor 202 executes client application software 206c (typically but not necessarily under control of an operation system not shown) to perform the various functions described below.

As shown in FIG. 2A, an internal or external digital or other camera 208 may be used to capture images of inspection items for storage into image database 206e. A locally or remotely attached printer 210 may be used to print hard copies of inspection reports and other data 206f. Other peripheral devices including webcams, audio and sound cards, projection capabilities, laser or other scanners, or any other type of peripheral could be used.

Example Overall Inspection Method

The exemplary illustrative non-limiting system is designed to be easy to use by vehicle inspectors. Vehicle inspectors are not necessarily computer experts, so the system is intended to be easy to learn and use by non-technical users.

When an inspector wishes to note that a particular vehicle part is damaged (FIG. 1B block 82), his/her (hereafter, simply 'his') first task is to pick the proper part in the inspection system that corresponds to the part on the vehicle that is damaged.

The first step in the algorithm is the identification of the vehicle's body type. This is accomplished through the use of decoding the VIN inputted at FIG. 1B block 78. In the exemplary illustrative non-limiting implementation, the first eleven characters of a VIN utilize an encoding scheme that can be decoded to provide information about the vehicle. One attribute that can be decoded in this way is the body style code of the vehicle. This process prevents inspectors from accidentally entering damages on parts that would make no sense in the context of a given vehicle style. For example, in one non-limiting implementation, the inspector cannot accidentally input a damage record for a pickup tailgate while inspecting a four-door sedan.

An illustrative exemplary non-limiting implementation includes a database and software algorithms capable of storing and enforcing customer criteria programmatically. Using these tools, new trainee inspectors can produce inspection reports that meet the client's or other criteria as closely as inspections performed by users with years of experience.

A database is provided on appliance 50 in connection with a rules engine 206g in which each record represents a combination of part, damage, severity, action, and (optionally) special condition(s) that are valid for a given client or application, as illustrated in FIG. 6.

Example integration of this data into the software system is illustrated in FIGS. 7, 8, 9, 10 and 11. First the inspector uses the flat car interface to select the damaged part as described above, in this case, the windshield (see FIG. 7). When the user clicks the mouse in the highlighted windshield area, the damage entry dialog box appears (see FIG. 8). The user then selects the large button labeled "Damage" (see FIG. 8). The list of damages allowed for a windshield is displayed (See FIG. 9). The user then selects the correct damage type. In this case the user is asked to select between particular mutually-exclusive damage descriptions: broken, bull's-eye, chipped, cracked, graphics present, multiple chips, multiple scratches, scratched. Once the user has selected a damage description (e.g. "bull's-eye"), the user then clicks the large button labeled "Severity" (see FIG. 10). The list of severities that are permissible for the part/damage combination and damage description is displayed (see FIG. 11). The user then selects the correct severity (e.g., ½" or less, or more than ½", as one particular example). If there were multiple corrective actions that would be allowed for part/damage/severity combination, then that list would be displayed. However, in this case there is only one allowable action, so the "Action" field is automatically filled with the only choice—in this case "replace" (see FIG. 11). Note that each of these various options is fully customizable on a client-by-client, vehicle-by-vehicle and/or inspection type basis to provide different criteria for different inspection clients, inspection types, vehicles and other factors.

This illustrative non-limiting exemplary approach provides several advantageous features including the following:

- The user can be prevented from selecting combinations of parts and damages that do not make sense, "Rusty Windshield" for example.
- The user can be restricted to list only those damages that interest the client or produce a relevant output.
- The user can be restricted to pick only repair actions that have been approved for use by the client or that make sense.
- The user can be focused to be concerned with severities that identify threshold levels as defined by the client or otherwise.
- The user does not have to memorize complicated rules for determining whether damages are chargeable.

Repair Labor And Cost Estimation

The exemplary illustrative non-limiting system herein supports part repair and replacement labor and cost estimation as well as providing direction on how to repair. The pricing system works in close conjunction with the inspection criteria system described above. Each criteria plan endpoint (i.e., each combination of part, damage, severity, and action) can be assigned a specific combination of repair, refinish, and parts installation hours or fixed costs. The combination can also specify part replacement costs, if applicable.

Figure 3A:
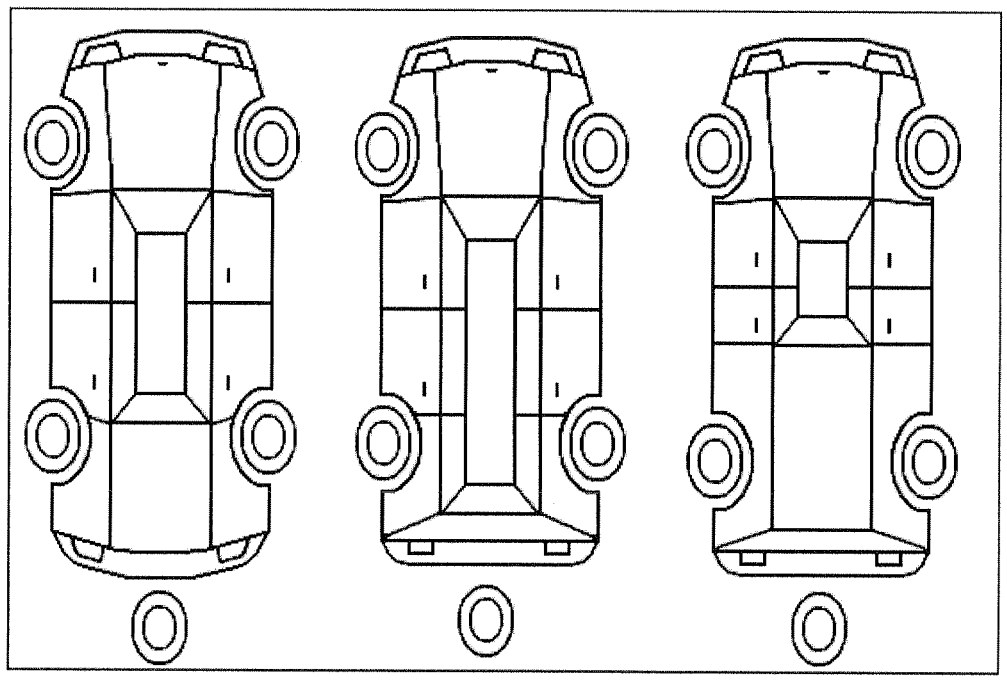
FIG. 3A shows example illustrative non-limiting stylized, top-down, 'flattened' views of vehicle body style groups.
Figure 3B:
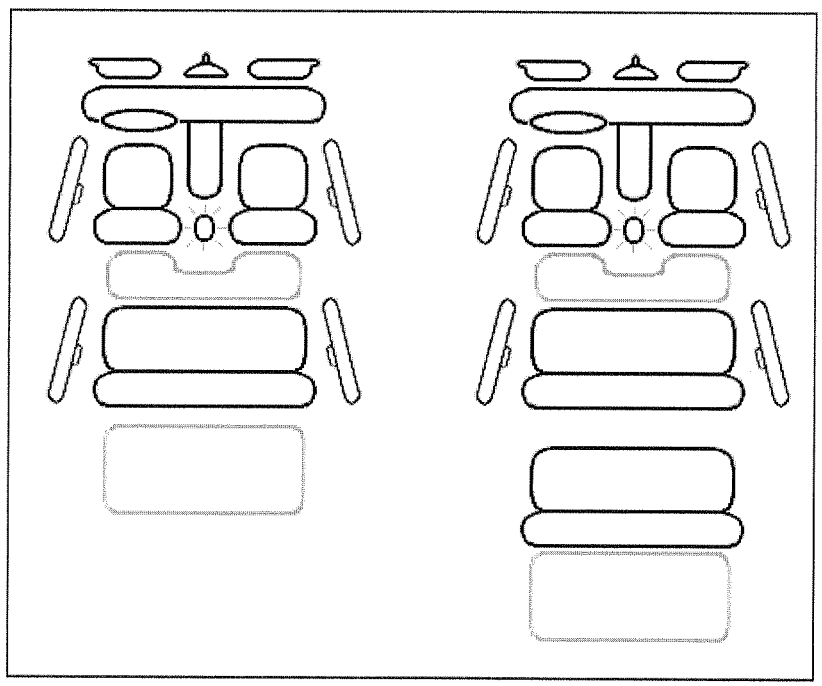
FIG. 3B shows example illustrative non-limiting images portraying interior views of different vehicle types.
Figures 4, 5:
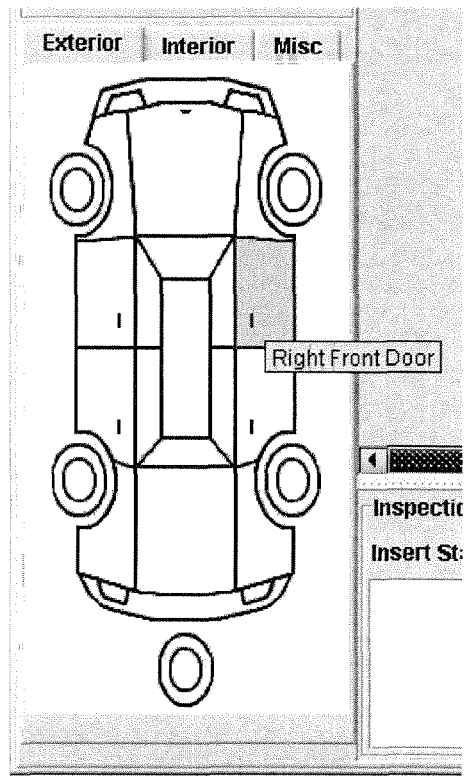
FIG. 4 shows an exemplary illustrative non-limiting use of a coordinate map to show the user hovering over the right front door area on the four-door sedan image.
FIG. 5 shows an exemplary illustrative non-limiting implementation of a displayed dialog window that allows the inspector to enter a damage record for either portions of a hierarchical set of parts.
Figures 7, 8:
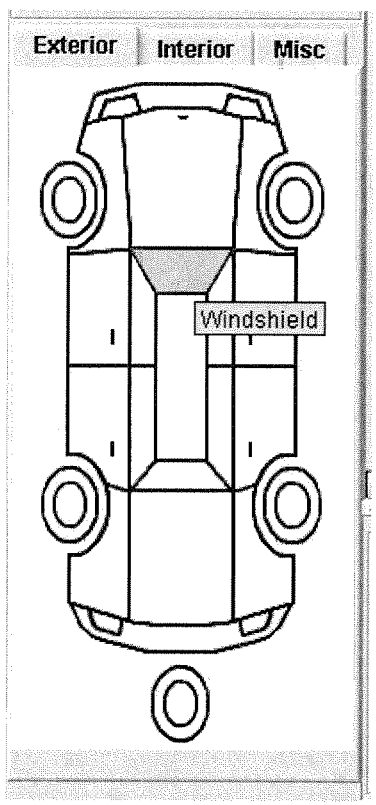
FIGS. 7, 8, 9, 10 & 11 show an exemplary illustrative non-limiting sequence of user interface screen displays for use in inputting damage or other characteristic information.
Figure 9:
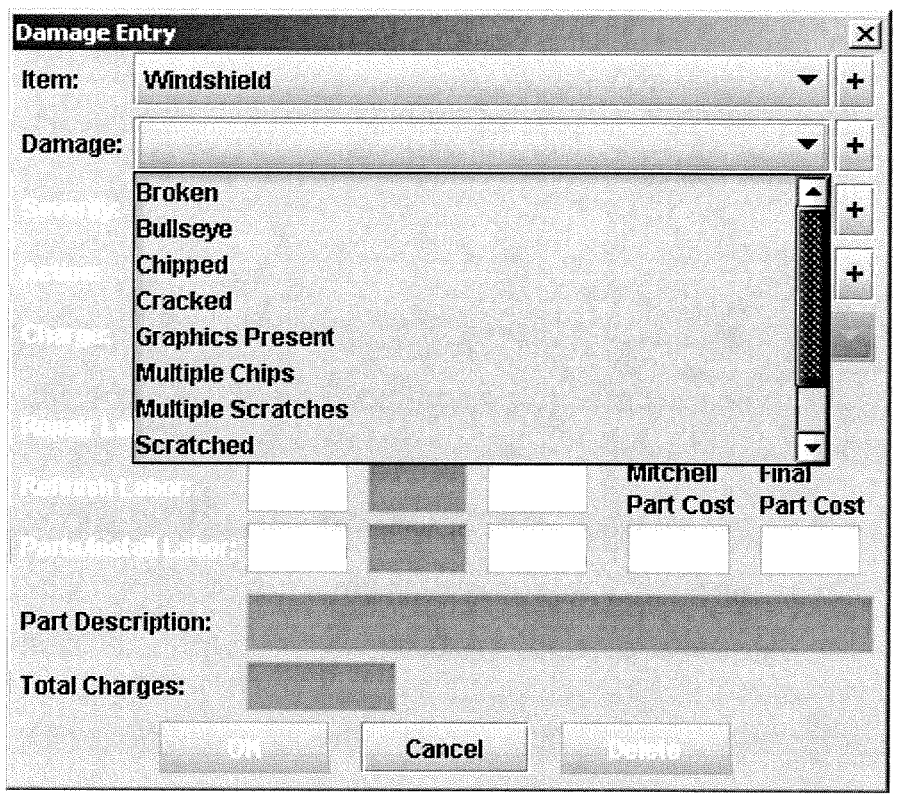
Figure 10:
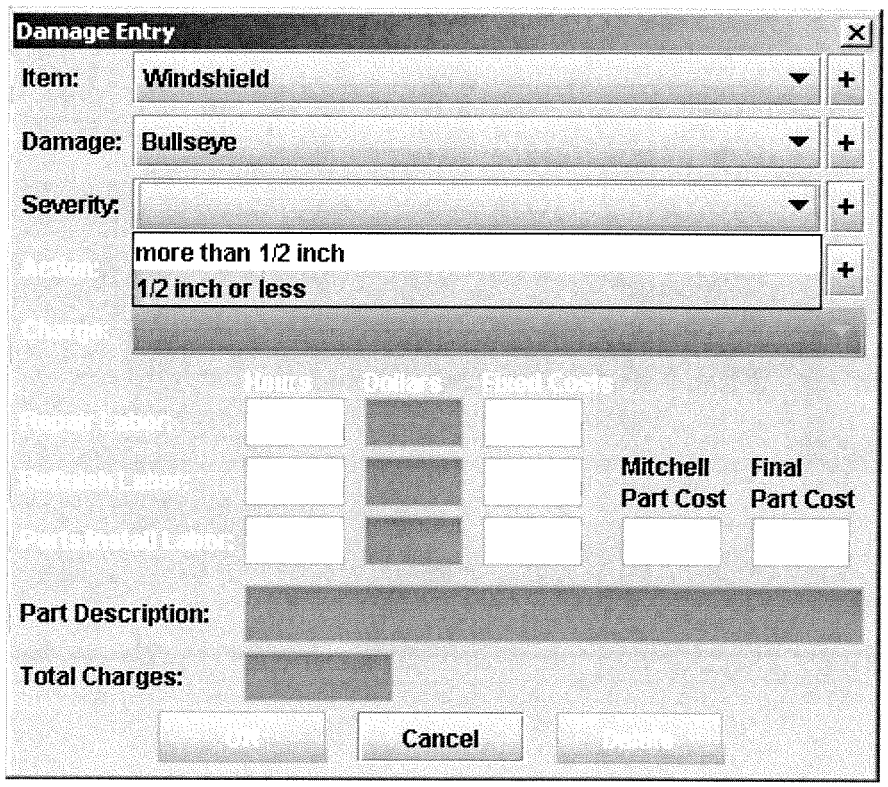
Figure 11:
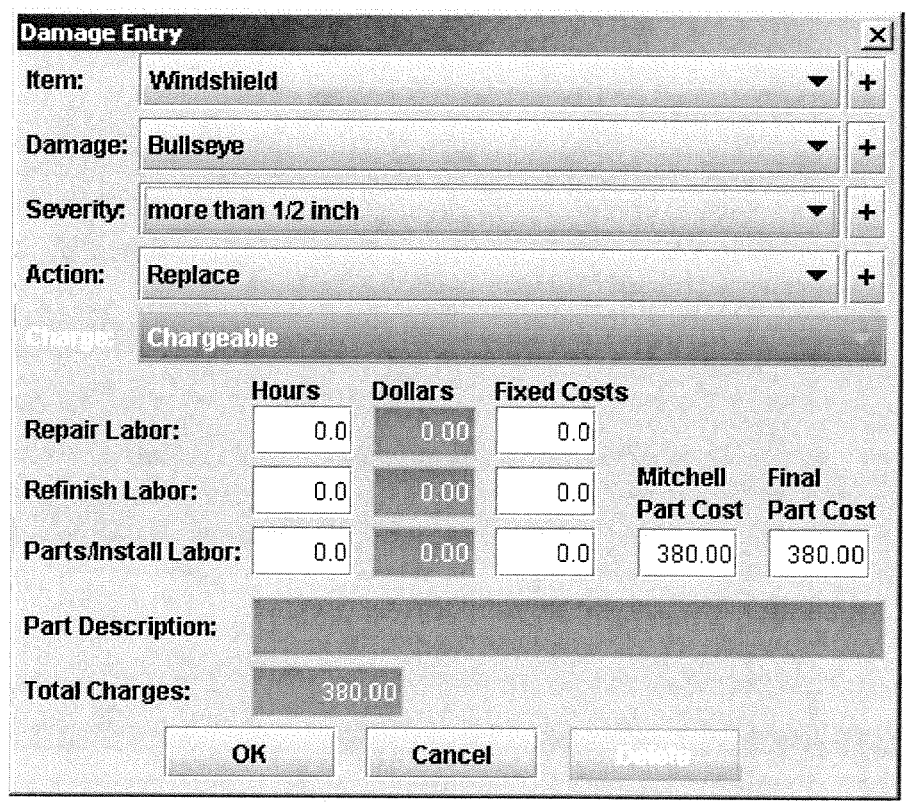
Figure 12A:
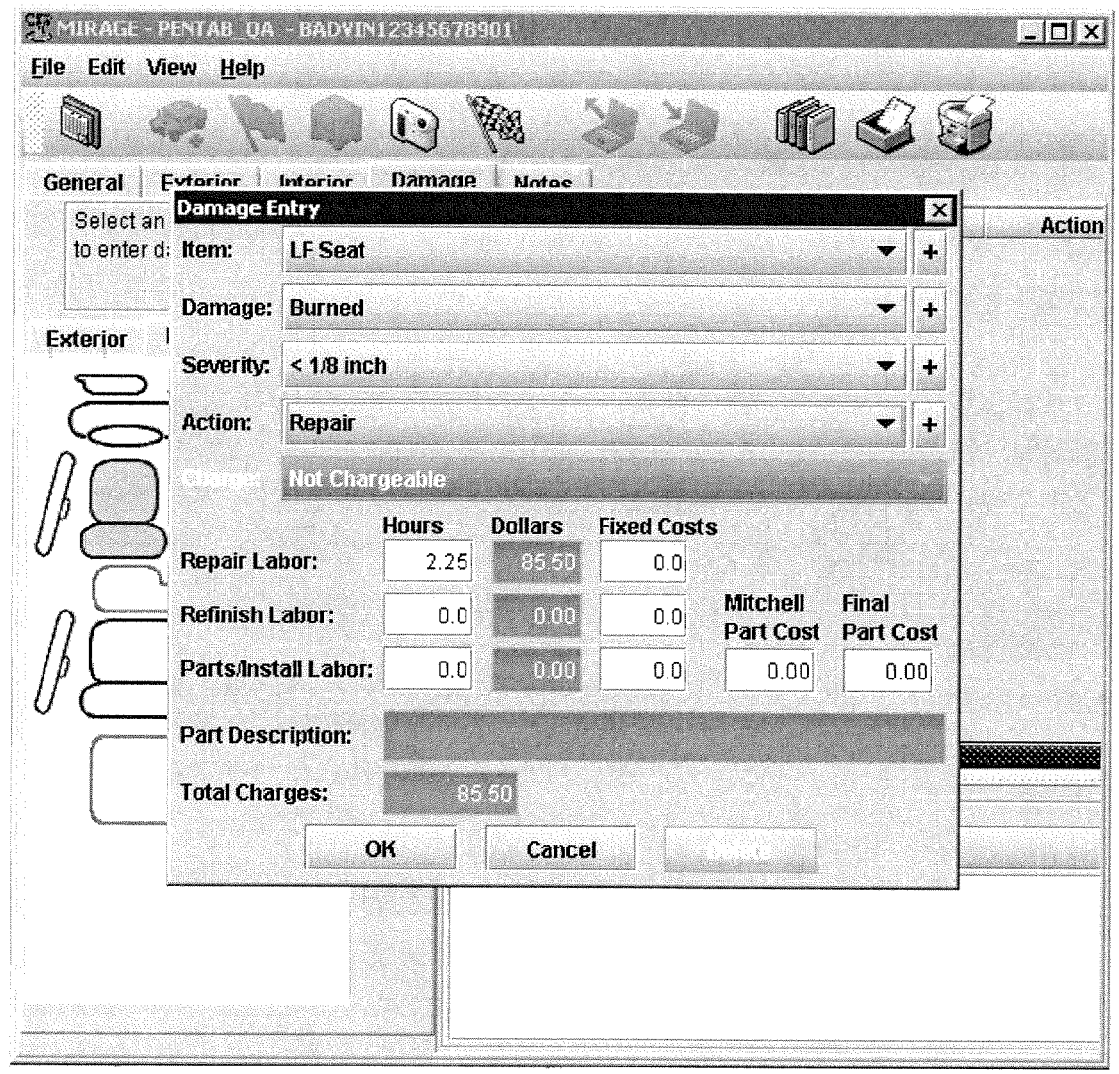
FIGS. 12A-12E are exemplary illustrative non-limiting damage entry screens.

For example, in the FIG. 12A illustrative non-limiting example user interface, the user has clicked on the left front seat area of a flat car damage picker of FIG. 3A, 3B. The damage entry dialog has appeared, and he has chosen the "Burned" damage, "<⅛ inch" severity, and the "Repair" action. For that combination of choices, the illustrative exemplary non-limiting implementation system has accessed the pricing database 206b and determined that the correct pricing is 2.25 hours of repair labor, at $38.00 per hour, for a total of $85.50.

The exemplary illustrative non-limiting system has also determined that this repair is not chargeable to the vehicle lessee, since burn holes under ⅛ inch are considered normal wear and tear by this lessor. A different client could have different customizable chargeability and pricing rules.

Figure 12B:
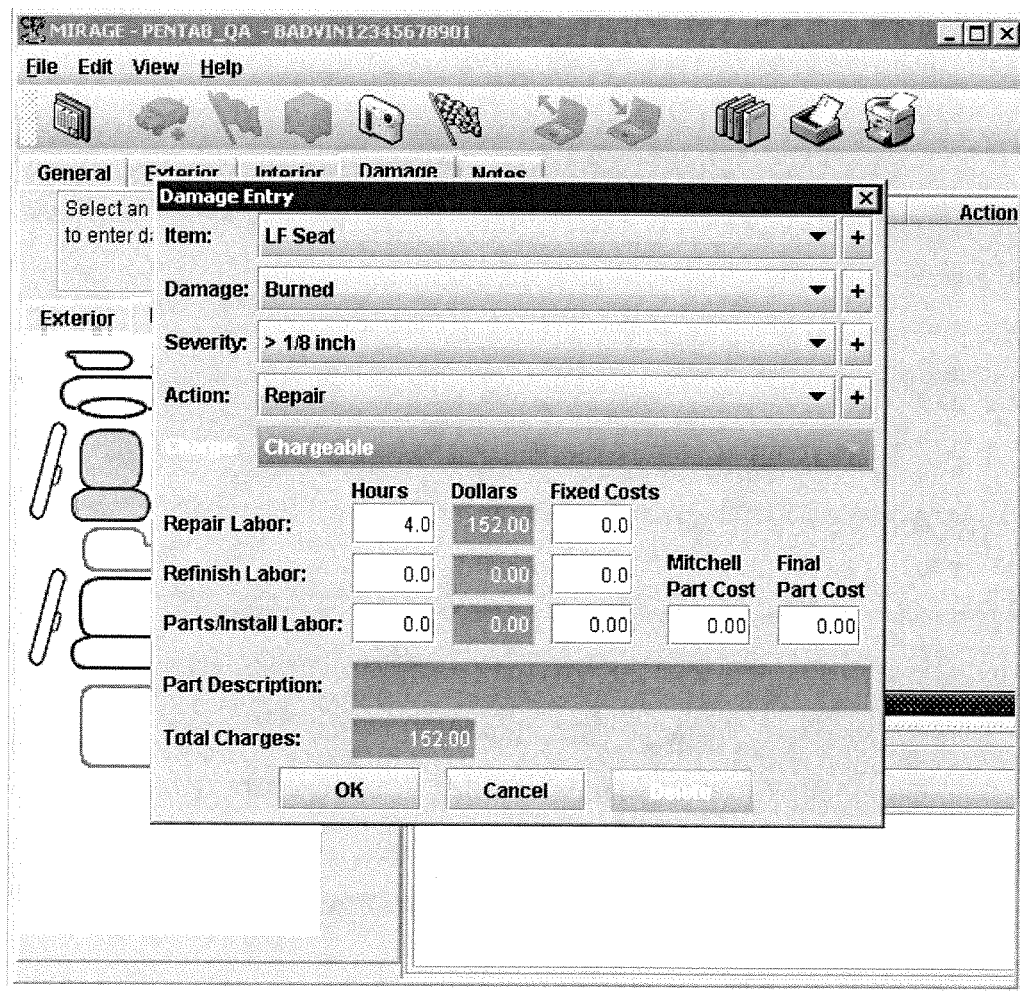

In the FIG. 12B exemplary illustrative non-limiting example, the user has chosen the same part, damage, and action, but the severity in this case is ">⅛ inch". That difference has resulted in the damage being considered as excess wear and tear, thus chargeable to the lessee. The pricing has also been increased to 4.0 hours, resulting in a total charge of $152.00.

The labor rates can be defined per client and will be applied to each damage calculation similarly. However, if necessary, the labor rates can be overridden for each criteria endpoint. For example, one particular client might have a default refinish labor rate of $40.00 per hour, but they might specify that refinish labor on interior wood dashboards should be charged at $50.00 per hour.

Figure 12C:
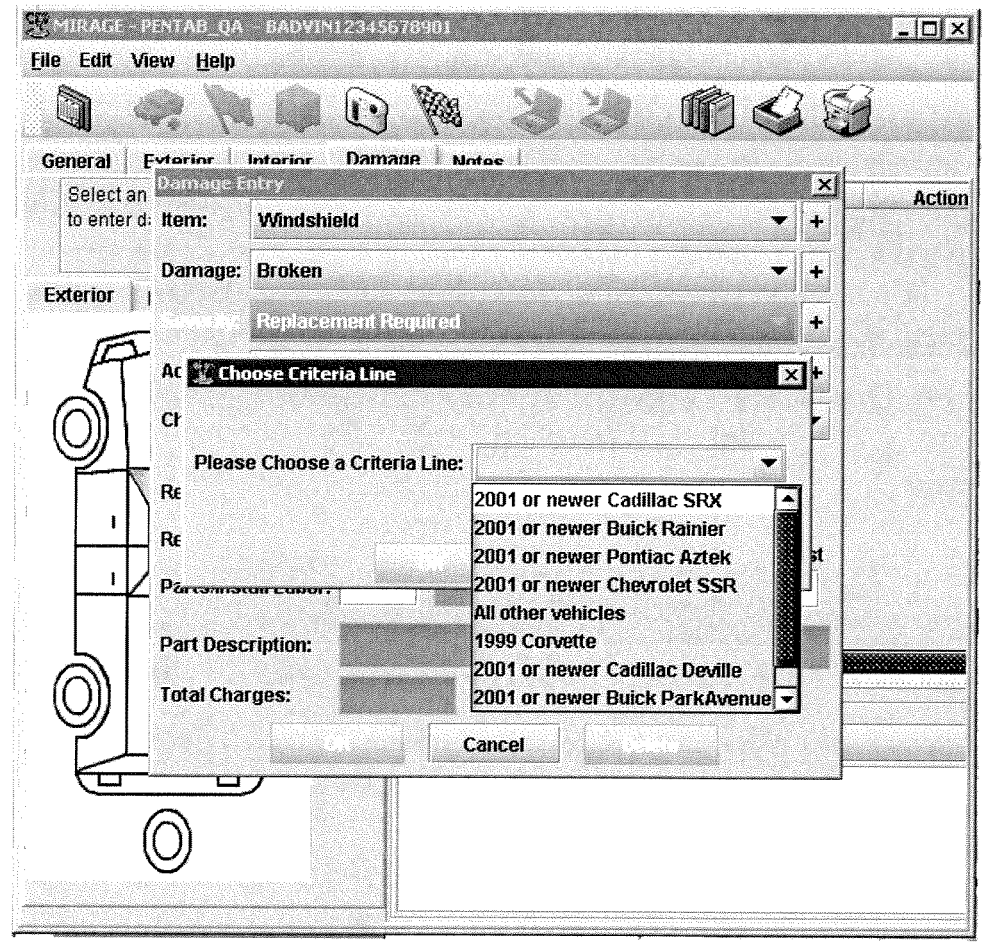

Each criteria plan endpoint can also be further sub-divided by a detailed comment list, with each choice in the list having its own pricing. In FIG. 12C, the user has clicked on the windshield area of the flat car damage picker. The damage entry dialog has appeared, and he has chosen the "Broken" damage. In the case of a broken windshield, the only allowable severity is "Replacement Required" and the only allowable action is "Replace", so those options have been chosen automatically. However, this particular client has defined different pricing levels for broken windshields based on the model of the car being inspected (see FIG. 12C).

Figure 12D:
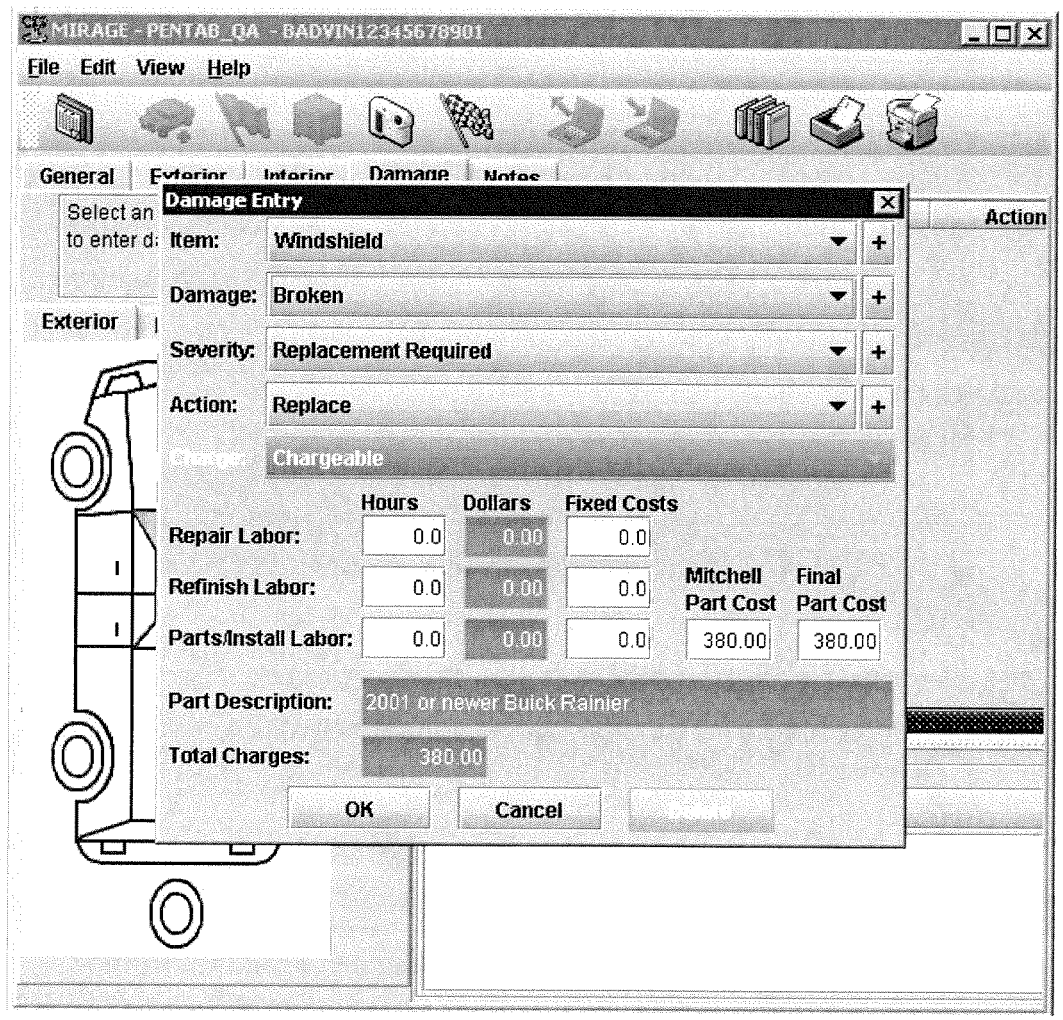
Figure 12E:
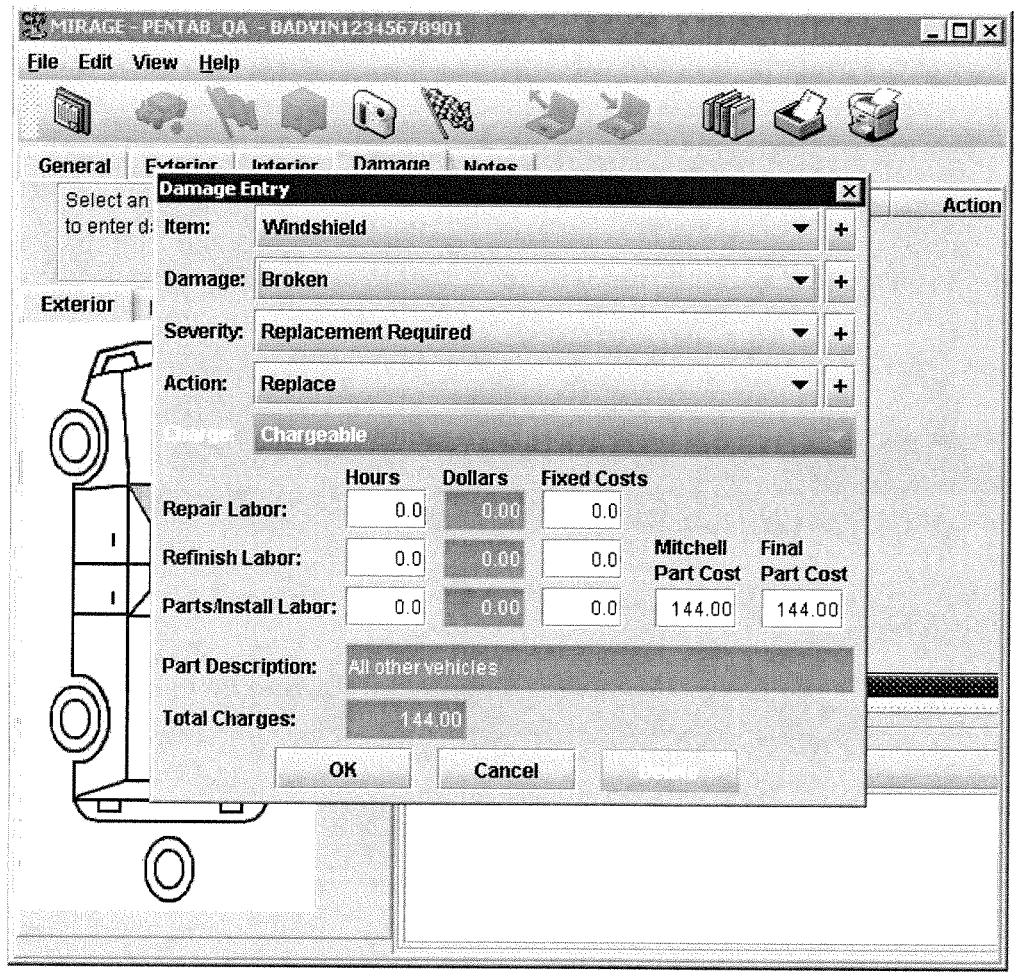

In one particular example, the user continues by selecting the "2001 or newer Buick Rainier" comment line. That choice results in a windshield replacement cost of $380.00 (see FIG. 12D). If in this example the user had instead picked "All other vehicles", for example, the windshield replacement pricing would have been set at $144.00 (see FIG. 12E). Or in other embodiments, the system can interpret the inputted VIN to automatically determine these parameters.

Other uses of the pricing subdivision include pricing the replacement of standard vs. powered antenna masts, providing different refinish rates for normal vs. metallic flake paint, or allowing different body shop repair time estimates for body panels dented on a curved edge rather than the flat part of the panel (see FIG. 1).

This integrated pricing structure means that the inspector 50 does not have to memorize complicated pricing schemes or constantly refer to printed pricing manuals. This provides an enormous productivity advantage over competing inspection systems.

Example Body Damage Assessment and Valuation

Figure 13A:
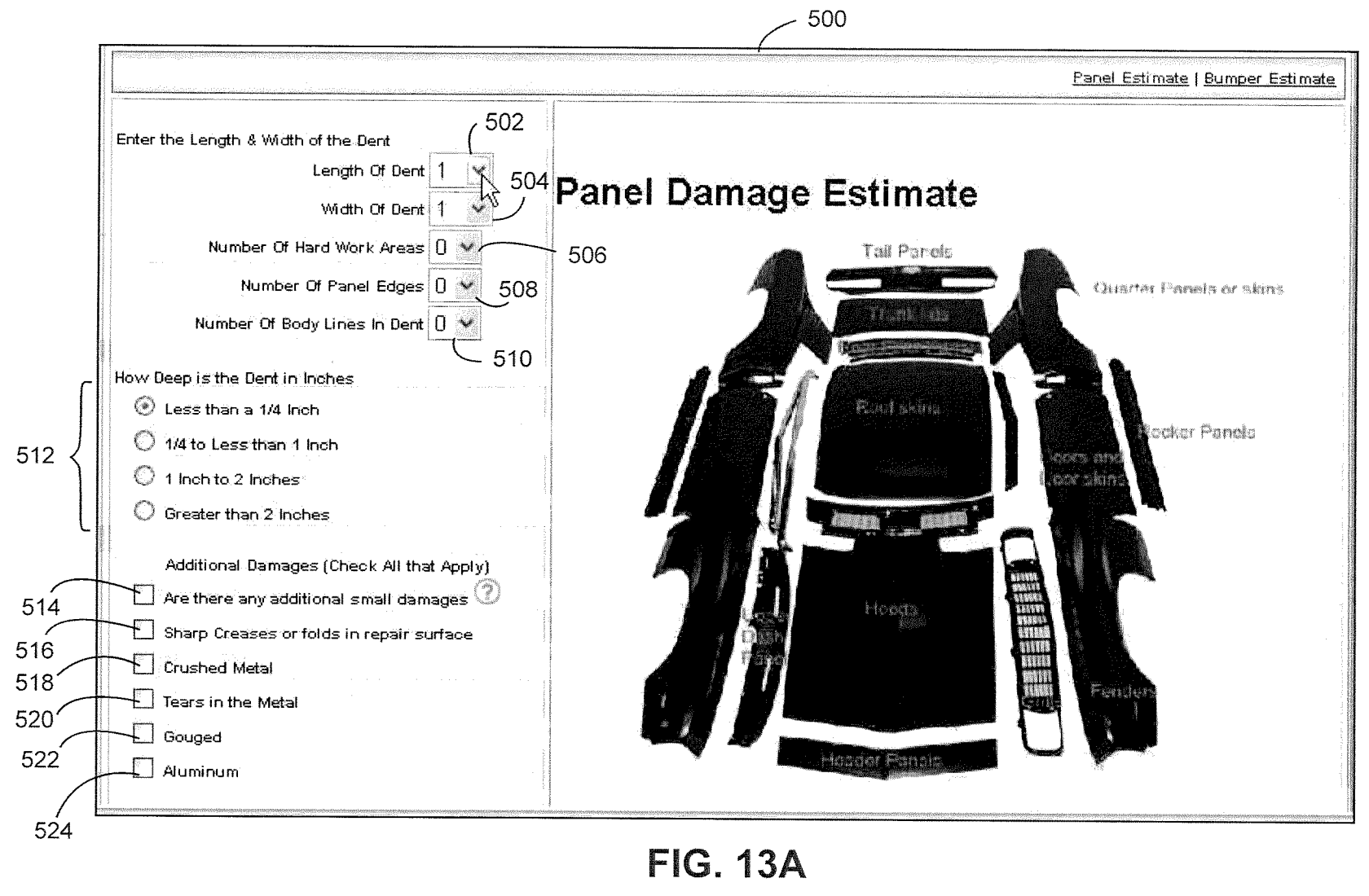

FIG. 13A shows an example non-limiting inspection input display 500 that may be used to input the detailed characteristics of particular types of body damage of vehicle 52. The particular example shown is for a dent estimator that uses a detailed computer algorithm to determine the best way to repair and then estimates the cost and time for repairing a dent, depression or other damage in the body of vehicle 52. Depending on the context, the technology can also be used to automatically direct or instruct service personnel to effect specific repairs. In one particular example, processor 104 performs this processing in response to input from processor 202 and sends data back to processor 202 for display, in other implementations processor 202 can perform some or all of the processing or the processing can be distributed.

Figure 15A:
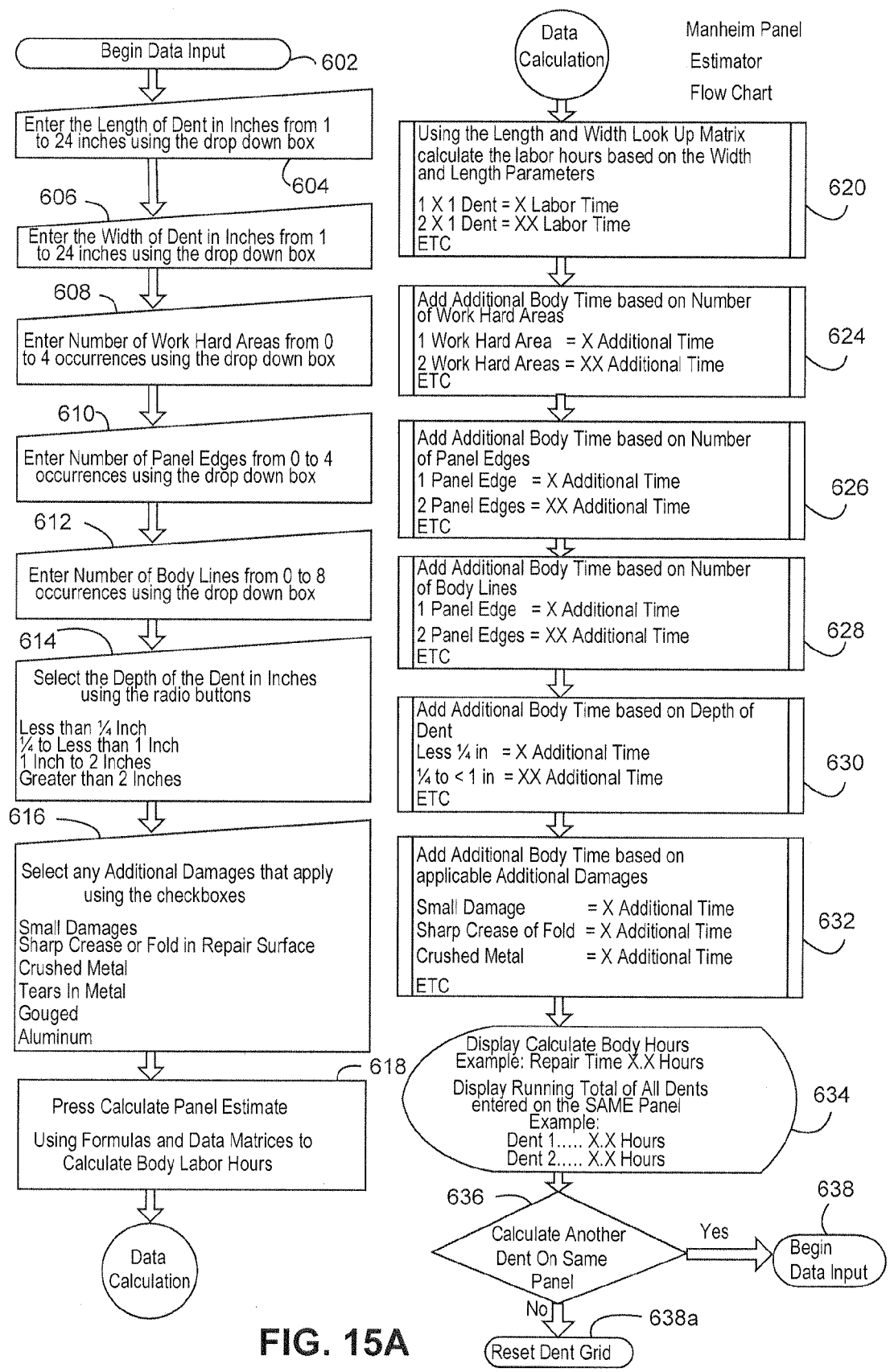
FIG. 15A shows an example panel estimator flow chart.

In this specific example user interface shown in FIG. 13A (to be understood in conjunction with the more detailed algorithm of executable instruction steps performed by processor 104 and/or processor 202), the user interface display 500 asks the inspector 50 to "enter the length and width of the dent" in for example inches (see data input fields 502, 504, FIG. 15A blocks 604, 606). The inspector 50 can measure the length and width of the dent using a ruler or other gauge. The example non-limiting implementation of user interface 500 requests the inspector 50 to use a pull-down list calibrated in inches to input the dimensions (length and width) of the dent to the nearest inch. Different input mechanisms (e.g., using a keyboard, etc.) are possible, although it is particularly efficient using a touch screen and stylus to select dent length and width based upon such pull down menuing.

The exemplary non-limiting user interface 500 then asks the inspector 50 to input the number of work hardened ("hard work") areas that have suffered damage into an input field 506 (FIG. 15A block 608). For example, certain parts of quarter panels that are hard work areas are more difficult to repair than other vehicle surfaces and therefore take more time. User interface 500 also requests the inspector 50 to input the number of panel edges into an input field 508 (FIG. 15A block 610), and the number of body lines in the dent in an input field 510 (FIG. 15A block 612). Dents that extend across an edge require more time to repair. Similarly, dents that cross body lines require more time to work the metal in order to get an original equipment manufacturer look. Usually dents do not cross more than two or three body lines, but the example non-limiting implementation allows input for up to eight. For example, each scallop in a door is a body line. Such body lines take more time to repair.

User interface 500 then asks the inspector 50 to specify how deep the dent is in inches (FIG. 15A block 614). In one example non-limiting implementation, rather than inputting a free formed numerical value using a keyboard, the inspector is asked to input the dent depth by clicking on one of four mutually exclusive "radio button" input selectors 512:

less than a certain size, for example ¼ inch or ½ inch or the like
 that certain size (e.g., ¼ inch, ½ inch or the like) to less than another certain size (e.g., 1 inch)
 1 inch to 2 inches
 greater than 2 inches.

In order to select one of these options 512, the inspector 50 uses a ruler or other gauge to measure the maximum depth of the dent, and selects the appropriate input option.

User interface 500 also requests the inspector 50 to specify whether any of the following additional damages are present such as for example using check boxes or other input mechanisms (FIG. 15A block 616):

are there any additional small damages? (field 514)
 sharp creases or folds in repair surface?
 crushed metal?
 tears in the metal?
 gouged?
 aluminum?

These fields 514-524 allow the computer to add in more time for repair based on some of the more common complications that can be visibly observed by inspector 50 based on appearance or other inspection. For example, sharp creases or folds require more time, as does crushed metal and tears in the metal. Gouges also require additional time. Aluminum body parts are often or usually more difficult to repair than steel or fiberglass. This is because aluminum is more difficult to shape once it becomes badly bent and work hardened, aluminum panels are usually thicker than steel counterparts, and some techniques common for working with steel (e.g., shrinking hammers) can cause aluminum to crack. See e.g., Duffy, Auto Body Repair Technology ($4^{th}$ Ed. 2003), incorporated herein by reference.

Figure 13B:

Once the inspector 50 has inputted all of the information requested by example user interface 500, the user can press a "calculate panel estimate" control (FIG. 15A, block 618) to cause appliance 62 and/or the remote processor to automatically calculate a panel damage estimate an example of which output display 530 is shown in FIG. 13B. More details about the detailed calculation algorithm performed by the processor(s) as shown in FIG. 15A is set forth below.

In the particular example shown in FIG. 13A and following, the top panel damage estimate provides an "estimated repair time" of 5.5 hours for a dent having a length of two inches, a width of four inches, a depth of less than ¼ inch, in a work hardened area, three lines within the dent, and other characteristics as specified. The particular example shown in FIG. 13B shows an additional dent number two that is less severe in that it is larger (length equals 3 inches, width equals 7 inches) but is not in a work hardened area and has no lines within it. Thus, this less severe dent in this particular example has an estimated repair time of only 1 hour as opposed to 5.5. An example appliance 62 automatically adds, sums or otherwise totalizes the total amount of repair time for all of body defects to provide an estimated repair time in hours of 6.5. In the example shown, appliance 62 may multiply the estimated repair time by the prevailing hourly rate based on a certain rate e.g., which can be based on one or more body shops in a geographical area, multiple rate based on local body shops, etc.), particular client, etc. in order to calculate estimated cost of repair.

In one possible implementation, the system focuses on the most pronounced damage. For instance, since the system is capable of "totalizing", if it noted damage on the fender that would fall under "repair" but also noted subsequent damage to same part that requires replacement, the system can be programmed to "ignore" the "repair" since it such damage will be inherently repaired when the entire part is replaced.

The processor(s) under software control generate an itemized report display a non-limiting example of which is shown in FIG. 13C. Note the ability to click on an image to view a photograph of the damaged area. Additionally, check boxes are provided allowing an authorizer or adjuster to approve or disapprove repairs on an item-by-item basis. Once the repairs are authorized in this manner, the vehicle can be released to a body shop who will actually do the work. Particular steps involved in performing this and other work as described in the above-referenced book Duffy, Auto Body Repair Technology, results in a change of state of the vehicle in that the dents and other damage are removed and repaired and the vehicle may once again look brand new.

As mentioned above, FIG. 15A shows an example non-limiting flowchart of the panel damage estimate process shown in FIGS. 13A-13C. This process is defined by software stored on a non-transitory storage device and executed automatically by a processor(s) to generate the displays discussed above. In this particular implementation, data input is begun (block 602) by the inspector 50 inputting the length of dent in inches into input field 502 using a dropdown box and specifying 1 to 24 inches in this particular example (block 604). The inspector 50 then inputs the width of the dent in inches into input field 504 (e.g., from 1 to 24 inches) using a dropdown box (block 606). The inspector 50 may then enter the number of work hardened areas (e.g., from 0 to 4 occurrences) into field 506 using the dropdown box (block 608). Inspector 50 may also enter the number of panel edges (e.g., from 0 to 4) into field 508 using the dropdown box (block 610). The inspector 50 may be further prompted to enter the number of body lines (e.g., from 0 to 8) into field 510 using a dropdown box (block 612). The inspector 50 is further prompted to select the depth of the dent in inches using the radio buttons 512 as mentioned above (block 614). The inspector 50 is further prompted to select any additional damages that apply using the checkboxes 514-524 (block 616).

Once the inspector 50 presses a "calculate panel estimate" button or otherwise initiates a calculate panel estimate, the appliance 62 uses stored formulas and data matrices to automatically calculate body labor hours (block 618).

In this particular example, appliance 62 uses a length and width lookup matrix to calculate the labor hours based on the width and length parameters (block 620). The processor can automatically calculate and totalize damage estimates for several (any number of) different damage items so that the system can provide an accurate estimate to repair all damage on a particular vehicle and return the vehicle to "like new" condition (see "1×1 Dent", "2×1 Dent", etc.). In one example non-limiting implementation, appliance 62 adjusts the repair time of each of the damage items upwardly based on the number of work hardened areas (block 624), number of panel edges (block 626), number of body lines (block 628), depth of the dent (block 630), and other additional damages (block 632) for those particular damage items. Appliance 62 then displays the calculated body hours (e.g., repair time X.X hours) (block 634). In the example shown, the appliance 62 may display a running total of all dents entered on the same panel (e.g., dent 1 X.X hours, dent 2 Y.Y hours) (block 634). Appliance 62 may then prompt the inspector 50 whether he wishes to calculate another dent on the same panel (decision block 636). If so, the user interface 500 is again displayed for a next dent and the user begins to input data as described above (block 638). Otherwise, the inspector 50 may then be prompted using the picker display described above to select a different part of the vehicle for inputting damage information ("no" exit to decision block 636).

Example Bumper Damage Estimator

Figure 14A:
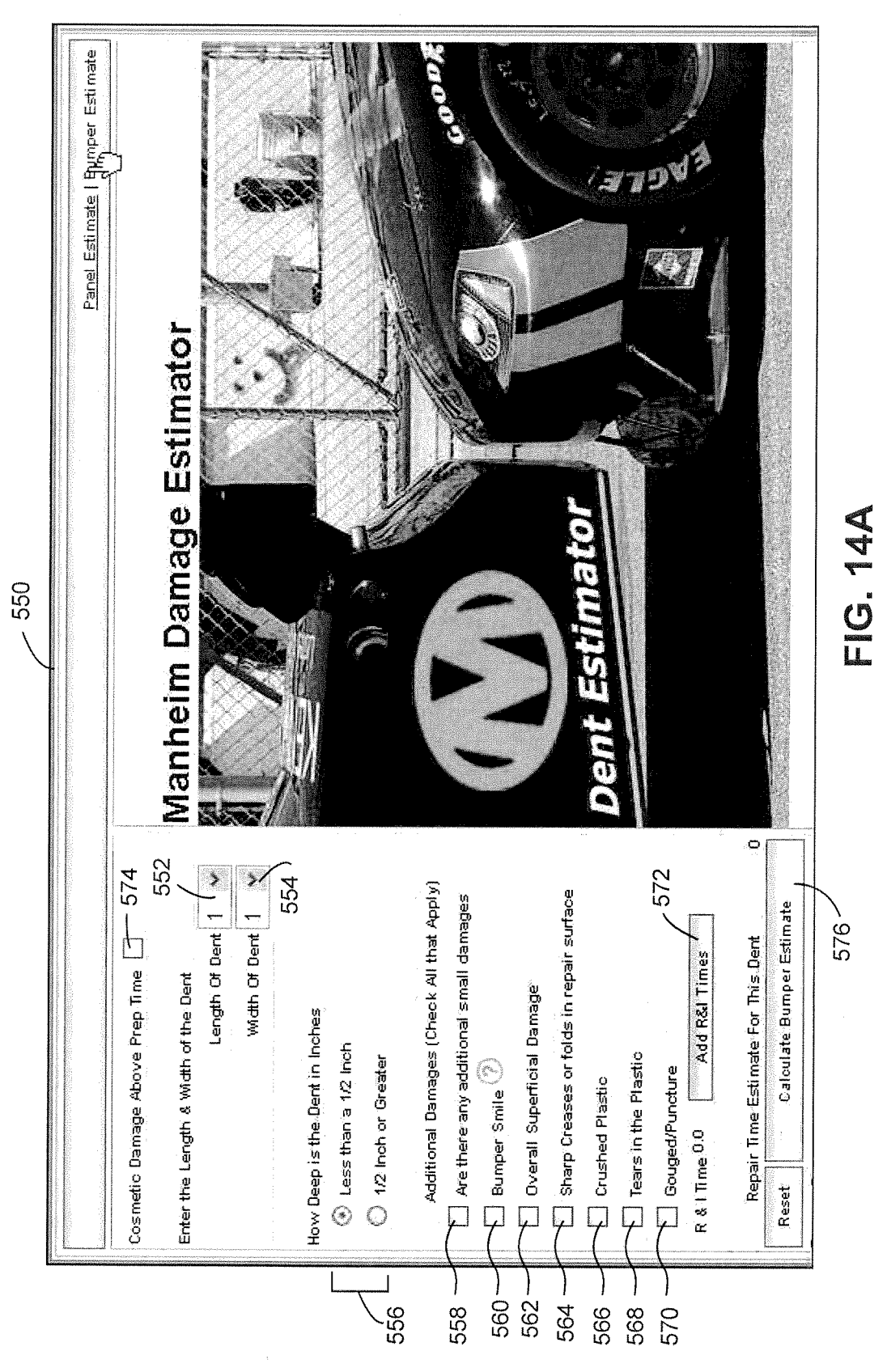
Figure 14B:
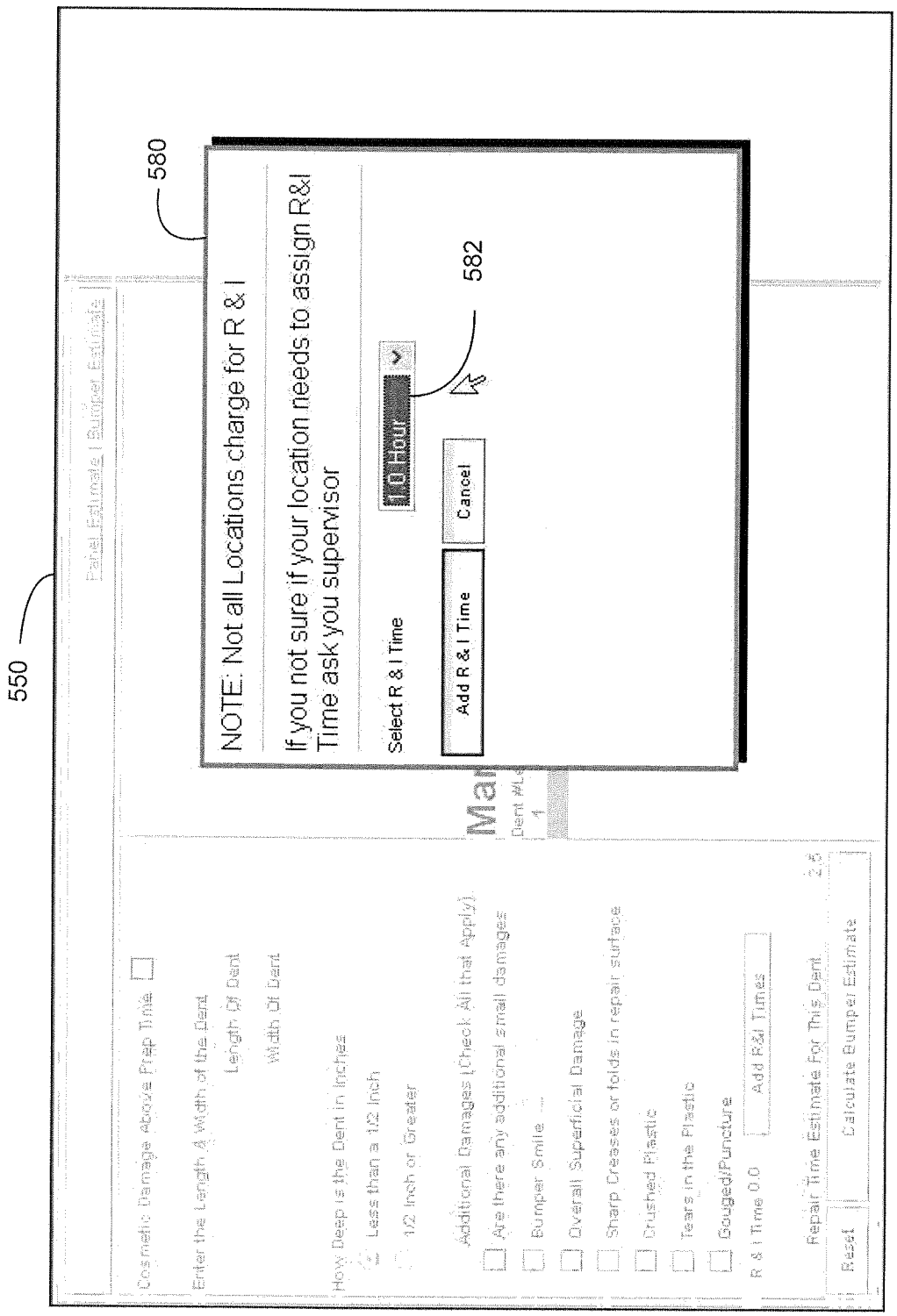
Figure 14C:
Figure 15B:
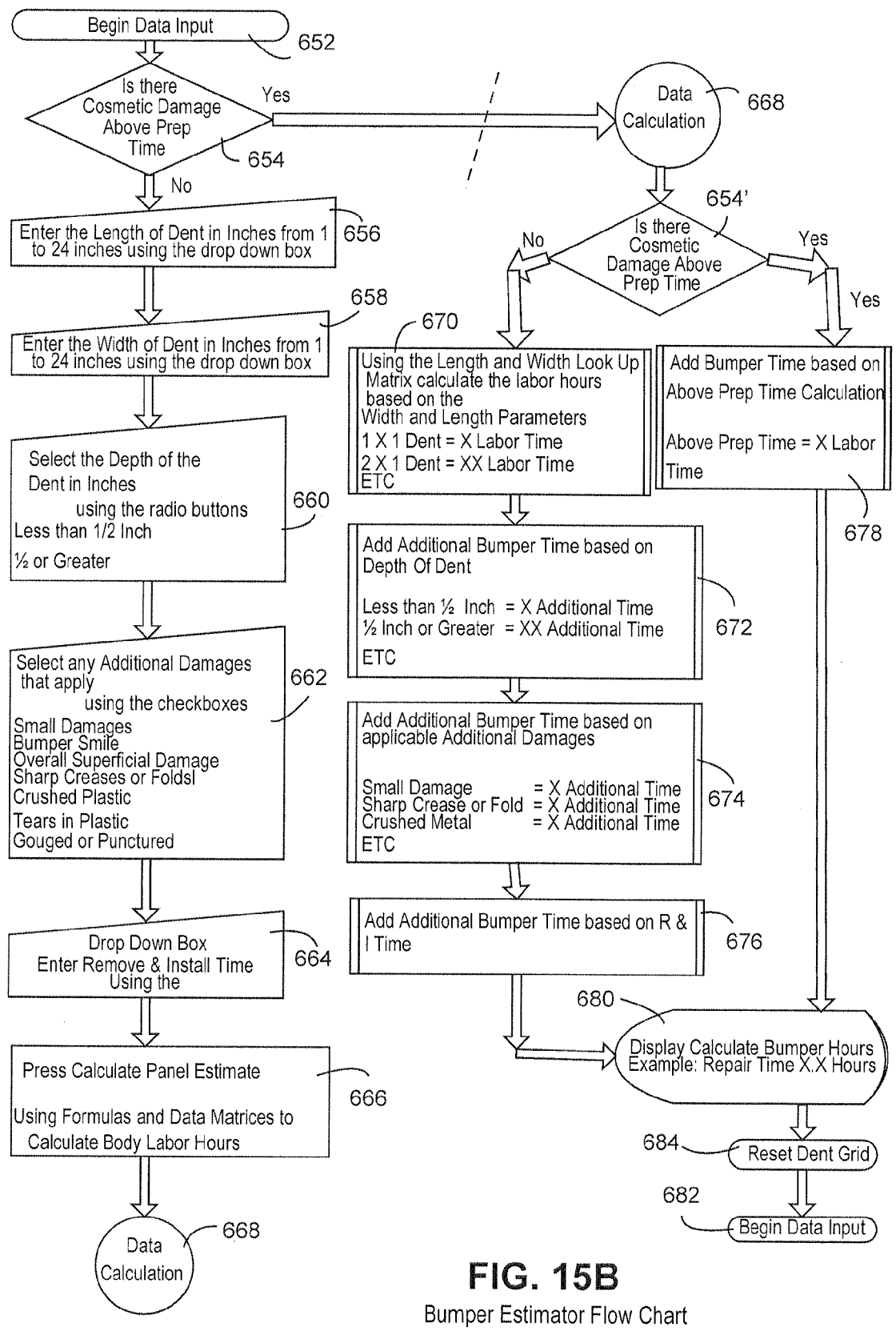
FIG. 15B shows an example bumper estimator flow chart.

FIGS. 14A-14C show an additional example non-limiting embodiment of a damage estimator for use in estimating the repair time and cost of bumpers, and FIG. 15B details a software controlled algorithm defined by software instructions stored in non-transitory memory and automatically executed by processor(s) 104 and/or 202 (in one particular example, processor 104 performs this processing in response to input from processor 202 and sends data back to processor 202 for display, in other implementations processor 202 can perform some or all of the processing or the processing can be distributed). In the example shown, in FIG. 14A, a user interface 550 requests the inspector 50 to enter the length and width of a dent in a bumper (input fields 552, 554; FIG. 15B block 656, 658) and also specify whether the dent is less than ½ inch in depth or ½ inch or greater (input fields 556, FIG. 15B block 660). The user interface 550 also asks the user to specify the following additional characteristics associated with a bumper dent (FIG. 15B block 662):

are there any additional small damages? (input field 558)
bumper smile? (input field 560)
overall superficial damage? (input field 562)
sharp creases or folds in repair surfaces? (input field 564)
crushed plastic? (input field 566)
tears in the plastic? (input field 568)
gouge/puncture (input field 570)
other For example, a "smile" in the bumper (when the plastic part of the bumper has been dented but is not cracked, it causes the plastic to crease usually with a white smile shape) requires additional work to remove. "Superficial damage" may be for example caused by rocks and/or dirt sand blasting the bumper surface, etc. requiring additional time for prep and paint. Gouges can increase the repair time as well.

In the example shown, user interface 550 allows inspector 50 to optionally add removal and installation time information by selecting button 572—or this can be done automatically (FIG. 15B block 664). Not all body shops charge extra for bumper removal and installation. In response to such selection, the user interface box 580 shown in FIG. 14B may be displayed warning the inspector to ask a supervisor if the inspector is sure the location needs to assign removal and installation time. If the inspector 50 does want to add removal and installation time, an input field 582 is provided to specify the amount of removal and installation time in hours. This functionality is provided because some locations or body shops prefer to remove bumpers from the vehicle rather than working on them in place.

Referring back to FIG. 14A, the example non-limiting implementation allows inspector 50 to also specify if there is cosmetic damage above prep time (input field 574; FIG. 15B block 654). Once the inspector 50 has provided all desired inputs and selected all appropriate input fields, the inspector may select the "calculate bumper estimate" button 576 and appliance 62 will automatically calculate an estimated repair time as shown in a FIG. 14C output display 590 (FIG. 15B block 666). In a particular example shown, appliance 62 calculates for a particular bumper dent having a length of 2 inches and a width of 3 inches and a depth of less than ½ inch, an estimated repair time of 2.5 hours. Appliance 62 may convert this into a cost by multiplying by appropriate prevailing rates and applying appropriate adjustments as necessary.

As discussed above, FIG. 15B is a flowchart of an example software-controlled process performed by processor 104 and/or 202 for estimating bumper damage repair time. In the example shown, a radio button 574 is used to specify whether there is cosmetic damage above prep time (block 652, decision block 654. If no, the inspector 50 is prompted to enter the length of the dent in inches (e.g., from 1 to 24 inches) using the dropdown box 552 (block 656) and to enter the width of the dent in inches (e.g., from 1 to 24 inches) using the dropdown box 554 (block 658). Inspector 50 is further prompted to select the depth of the dent in inches using the radio buttons 556 as described above (block 660), and to select any particular additional damages that apply using the check boxes 558-570 (block 662). The inspector 50 is further prompted to optionally enter remove and install time if desired (as described above) using the button 572 (block 664) or this information can be supplied automatically from a database. Upon pressing the "calculate bumper estimate" button 576, appliance 62 uses formulas and data matrices to calculate body labor hours (block 666). The data calculated may then be displayed (block 668).

FIG. 15B further shows an example detailed data calculation algorithmic operation 668 that may be impacted by whether there is cosmetic damage above prep time (block 654, "yes" exit to decision block). If there is no cosmetic damage above prep time (block 654', "no" exit), appliance 62 uses the length and width lookup matrix to calculate the labor body hours based upon width and length parameters (block 670), and may add additional repair time based on the depth of the dent (block 672), additional damages as described above (block 674), and remove and installation time if applicable (block 676). If the inspector 50 specifies that there is cosmetic damage above prep time ("yes" exit to decision block 654'), appliance 62 adds bumper time based on the above prep time calculation (e.g., above prep time=X labor time) (block 678). Either way, appliance 62 may display the repair time in hours (block 680), and then reset the dent grid shown in FIG. 14A (block 682) in preparation for an additional data input (block 684).

Example Non-Limiting Conventional Standards for Assessing Exterior Damage

The following are example non-limiting conventional reporting standards that may be used to guide recommendations and reporting of individual repairs:

Multiple Damages:

For panels with multiple damages, all damages must be listed. For example, the LF Fender of the vehicle being inspected has a dent 3" to 4", a heavy scratch 2" to 3", and a light scratch 4" to 5", the damages should be listed individually.

Paint Damage:

Paint chips (per panel)—Chipped or Multiple Chips|Number of Occurrences

Paint which is peeling or cracked—Size Severity

A light scratch or scuff that does not penetrate the clear coat—Size Severity

Multiple light scratches|number of occurrences

A heavy scratch—Size Severity

Multiple heavy scratches—Number of Occurrences

A comment should be placed on the damage line indicating the total length of all scratches if possible.

Bug damage that is not severe enough to warrant a repair—Bug Damage|Acceptable

Bug damage that is severe enough to need repair—Bug Damage|Repair Required

Paint damaged from tree sap, acid rain, bird droppings, etc. that is—Environmental Paint Damage|Size Severity Panels that have Road Paint/Overspray—Road Paint/Overspray|Size Severity Factory emblems, stripes, or decals that are missing or damaged—Appropriate Damage|Replacement Required Any OEM stripes or decals that require removal for repair or refinish of a panel—Remove/Install|Removal Required Emblems (as it pertains to a part), that require removal for repair or refinish of a panel—Remove/Install|Removal Required Any aftermarket logos, decals, or auto wrap that require removal choose—Overall Vehicle|De-Identify|Removal Required Panels with mismatched paint—Mismatched|Unacceptable Body Damage:

Paint-less Dent Removal (PDR) is a per panel estimate

Dents with no paint damage that are one (1) inch or less—Dent/No Paint Dmg|PDR/1 to PDR>10

A single dent without paint damage that is greater than one (1) inch in diameter—Dent/No Paint Dmg|Size Severity Multiple dents without paint damage that are larger than one (1) inch—Number of Occurrences A comment should be placed on the damage line indicating the total size of all dents if possible.

Note Multiple dents without paint damage that are 7 or more in number of occurrences (regardless of size) must have an action of repair A single dent with paint damage—Dent/Paint Dmg|Size Severity Multiple dents with paint damage regardless of size—Number of Occurrences A comment should be placed on the damage line indicating the total size of all dents if possible.

If a panel has multiple dents with and without paint damage, inspector may select the damage of multiple dents w/paint damage for all dents and list number of occurrences as outlined above. Since each dent may be listed separately, it is possible from those separate entries that the system would make this determination on its own.

Any dent or dents that are severe enough in nature or location that would require the panel to be replaced—Severe Damage|Size Severity All dent repairs have a one (1) hour minimum repair time for the first inch in dent size.

Add a ½ hour labor for each additional inch in size of the dent (refinish labor must also be added as described below). For example: dent size is 3 inches—labor to repair is 2 hours plus paint labor.

Add ½ hour labor for dents on Contours, Body lines, and any work hard areas.

Cracks, Cuts, tears, and gouges—Size Severity

Holes and punctures—Size Severity

Panels that have rust damage—Rust|Size Severity

Panels that have rust damage to the point of needing replacement—Rust|Severe Damage Exterior Molding and Trim:

Chips to all painted molding, cladding or trim—Number of Occurrences

A single Light scratch or scuff to all painted molding, cladding or trim that do not penetrate the clear coat—Size Severity Multiple light scratches and scuffs to all painted molding, cladding or trim that do not penetrate the clear coat—Number of Occurrences Gouges, cracks, heavy scratches, tears, or cuts to molding, cladding or trim—Size Severity Multiple heavy scratches to molding, cladding or trim—Number of Occurrences Any dented (with or without paint damage), bent, broken, holes, or punctures to the molding, cladding or trim—Size Severity Multiple dents (with or without paint damage) to the molding, cladding or trim—Number of Occurrences Paint on any molding which is peeling or cracked—Size Severity Loose molding or trim—Loose|Repair Required Prior Repairs:

Poor previous repairs are defined as being inferior in quality to commercially acceptable repairs.

Poor previous repairs are defined as those having improper color match and noticeable texture difference. There must be no severe sand/grinding marks or excessive overspray. The inspector should attempt to capture the grind marks and/or excessive overspray in the supporting inspection photo. Parts (doors/bumpers etc.) that are misaligned (unless severely misaligned) and tape lines are not to be considered poor repairs but must be disclosed and adjustments suggested.

Prior repairs that are "Acceptable" in quality (NOT substandard)—Prev Repair|Acceptable All prior repairs that are "Substandard" (Clearly Substandard) in quality are to be listed as damage line items and priced out based on correcting the panel to acceptable condition—Prev Repair|Substd Repair A comment should be placed on the damage line indicating the reason the repair is substandard if possible (sanding marks, paint runs, etc).

For substandard repairs that can be buffed out—Prev Repair|Buffable

If a panel has been replaced (i.e. fender, hood, door skin), and the work is acceptable—Replaced|Acceptable If a panel has been replaced (i.e. fender, hood, door skin), and the work is unacceptable—Replaced|Substd Repair A comment should be placed on the damage line indicating the reason the repair is substandard if possible (sanding marks, paint runs, etc).

If the entire vehicle has been repainted to a color different from the original color, and the repaint is of acceptable quality—Overall Vehicle|Repainted|Non-OEM If the entire vehicle has been repainted and the repaint is of substandard quality, each repainted panel must be listed—Prev Repair|Substd Repair If the vehicle has had some but not all panels repainted to a color different from the original color, each repainted panel must be listed as "Prev Repair" and noted as "Acceptable" or "Substd Repair" as indicated above.

Pickup Truck Beds:

Beds with scratches (regardless of size and severity) and minor dents (up to four inches)—Inside Bed|appropriate damage|appropriate severity (as described in paint & body damage section).

Metal Bumpers:

Any damage to Chrome Metal Bumpers—select the appropriate damage and severity (as described in paint & body damage section).

Painted Metal bumpers with paint chip(s)—Chipped or Multiple Chips|Number of Occurrences A light scratch or scuff on painted metal bumpers that does not penetrate the clear coat—Size Severity Multiple light scratches—Number of Occurrences Painted Metal bumpers with heavy scratches or sandblasting—Size Severity Multiple heavy scratches—Number of Occurrences A comment should be placed on the damage line indicating the total length of all scratches if possible.

Paint which is peeling or cracked—Size Severity

Any dent, cut, tear, hole or bend in any metal bumpers—Size Severity

Bumper Covers:

For a full bumper cover repair, you must select the complete bumper cover as the part.

For a partial bumper cover repair, you must select the appropriate bumper piece or section such as "LF Bumper Cover".

A "Partial Repair" is defined as a repair area not exceeding ⅓ of the entire bumper surface. ⅓ of a bumper is any area measured horizontally that is no greater than one third of the bumpers total end-to-end length.

You can have one (1) partial repair per bumper.

Vehicles that have "Tri-Coat" or "Three Stage" paint cannot have partial repairs performed. They can only have full panel repair or refinish.

Bumper covers with paint chip(s)—Chipped or Multiple Chips' Number of Occurrences A light scratch or scuff that does not penetrate the clear coat—Size Severity Multiple light scratches—Number of Occurrences A heavy scratch—Size Severity Multiple heavy scratches—Number of Occurrences A comment should be placed on the damage line indicating the total length of all scratches if possible.

Paint which is peeling or cracked—Size Severity

A cut, crack, tear, gouge, bend or dent with or without paint damage—Size Severity Multiple dents with or without paint damage—Number of occurrences A comment should be placed on the damage line indicating the total size of all dents if possible.

Holes and punctures—Size Severity

Lower bumper covers, valances, spoilers & air dams with multiple scrapes & scratches (light or heavy)—Curb Rash|Size Severity Hail Damage:

For each damaged panel, select "Hail Dmg"—Number of occurrences

While the technology herein has been described in connection with exemplary illustrative non-limiting implementations, the invention is not to be limited by the disclosure. For example, while the exemplary illustrative non-limiting example described herein focuses on used motor vehicles, many other applications and uses are possible and contemplated. The invention is intended to be defined by the claims and to cover all corresponding and equivalent arrangements whether or not specifically disclosed herein.

We claim:

1. A computer-performed method of parameterizing repair of damage to a motor vehicle by using at least one processor and at least one non-transitory storage device storing executable code, said at least one processor executing said stored executable code to provide a visually-perceptible display on a touch screen display, wherein the touch screen display is provided on a handheld housing containing a camera, the method comprising:
   (1) automatically receiving, with the at least one processor, input indicating dimensions of a dent, the at least one processor automatically analyzing image data from the camera to automatically ascertain extent of damage to the motor vehicle;
   (2) automatically receiving, with the at least one processor, touch screen input indicating sharp creases or folds in a repair surface corresponding to the dent;
   (3) automatically receiving, with the at least one processor, touch screen input indicating gouges, tears or crushed material in the repair surface;
   (4) automatically receiving, with the at least one processor, touch screen input indicating how many hard worked surfaces are subject to repair in repairing the dent;
   (5) in response to at least the received inputs, automatically, with the at least one processor, parameterizing at least time and cost to repair the dent;
   (6) automatically, with the at least one processor, iterating steps (1)-(5) for each of plural dents in the motor vehicle; and
   (7) automatically calculating, with the at least one processor, totalized parameterized repair outputs for use in changing the repair state of the motor vehicle.

2. The method of claim 1 further including displaying, with the at least one processor, vehicle condition on said display device, said displayed condition interactively changing based on approval of selected ones of a list of damage to the motor vehicle.

3. The method as in claim 1 further including the at least one processor automatically calculating an overall condition grade of the motor vehicle based on said inputs.

4. The method of claim 1 further including requesting a user to identify damaged portions of a motor vehicle by touching a flat depiction of the motor vehicle on a touch screen.

5. The method of claim 1 wherein said requesting is provided using dropdown menus and radio buttons.

6. In a computing system including a processor, at least one input device, and a display, said computing device including at least one storage device storing executable code to be executed by the processor, said processor at least in part controlling the display to display information that is visually perceptible by a user, said processor accepting input from the user via the at least one input device and affecting the information displayed on the display in order to provide interaction with the user, the display being provided on a handheld housing containing a camera, the computing device processor executing the executable code stored by the storage device to perform the following functions:
   (a) receive inputted length and width dimensions of a dent in a motor vehicle body;
   (b) receive inputted number of work hardened areas to be repaired;
   (c) receive inputted number of panel edges to be repaired;
   (d) receive inputted number of body lines to be repaired;
   (e) receive inputted additional damage associated with the dent, the computing device processor automatically analyzing image data from the camera to automatically ascertain extent of damage to the motor vehicle;
   (f) accept and process said inputted number of work hardened areas to be repaired, number of panel edges to be repaired, number of body lines to be repaired, and additional damage associated with the dent to automatically calculate how much time required to repair the dent based on the length and width of the dent, adjusting the calculated repair time based on the input number of work hardened areas, panel edges, body lines, and additional damage;
   (g) based on the automatically calculated and adjusted time, automatically calculating how much it will cost to repair the dent; and
   (h) providing an electronic presentation enabling further input to authorize repair.

7. The system of claim 6 wherein (a) includes requesting a user to input length, width and depth of the dent and the calculating includes using a lookup table to automatically estimate repair time based on the length, width and depth of the dent.

8. The system of claim 6 further including requesting the user to input whether there are any additional damages including sharp creases or folds, crushed metal, tears or gouges.

9. The system of claim 6 further including requesting the user to input whether the body part having the dent is made of aluminum.

10. The system of claim 6 wherein said processor executes said instructions to calculate repair time at least in response to work in hard area, lines within dent, and dimensions of dent.

11. The system of claim 6 wherein the processor requests the user to input the length and width of the dent using a dropdown menu.

12. The system of claim 6 wherein the processor requests the user to enter number of panel edges using a dropdown menu.

13. The system of claim 6 wherein the processor requests the user to enter the number of work hard areas using a dropdown box.

14. The system of claim 6 wherein the processor requests the user to input the depth of the dent using radio buttons.

15. The system of claim 6 wherein the processor uses formulas and data matrices to calculate body labor hours by calculating labor hours based on dent width and length parameters, and then adjusts the number of labor hours based on number of work hard areas, number of panel edges, number of body lines, depth of the dent and additional damages.

16. The system of claim 6 wherein the processor calculates a running total of repair estimate of all dents on the same vehicle panel.

17. The system of claim 6 wherein said display comprises a touch screen, and said enabling is provided by the user touching the touch screen either directly or with a stylus.

18. The system of claim 6 wherein said computing device comprises a portable, wirelessly-connected inspection device having said display on a surface thereof and housing said at least said processor and a wireless communications device.

19. A non-transitory storage device storing executable instructions that when executed by at least one processor control the processor to parameterize repair of damage to a motor vehicle, said processor being configured to provide a visually-perceptible display on a touch screen display, wherein the touch screen display is provided on a handheld housing containing a camera, the non-transitory storage device storing:

first instructions controlling the processor to automatically request a user to input dimensions of a dent;

second instructions controlling the processor to automatically request the user to input via the touch screen whether there are sharp creases or folds in a repair surface corresponding to the dent;

third instructions controlling the processor to automatically request the user to input via the touch screen whether there are gouges, tears or crushed material in the repair surface;

fourth instructions controlling the processor to automatically request the user to input via the touch screen how many hard worked surfaces are subject to repair in repairing the dent;

fifth instructions controlling the processor to automatically analyze image data from the camera to automatically ascertain extent of damage to the motor vehicle, and in response to at least the received user inputs, automatically parameterize at least time and cost to repair the dent by using a length and width lookup matrix to calculate labor hours based on the width and length parameters, add additional body time based on number of work hard areas, number of panel edges, number of body lines, depth of the dent, sharp crease or fold, crushed metal and other factors;

sixth instructions controlling the processor to automatically iterate execution of the first through fifth instructions for each of plural dents in the motor vehicle; and seventh instructions controlling the processor to automatically provide parameterized repair outputs that will result in changing the repair state of the motor vehicle.

* * * * *